(12) United States Patent
Lee et al.

(10) Patent No.: US 9,179,443 B2
(45) Date of Patent: Nov. 3, 2015

(54) METHOD AND APPARATUS FOR PROVIDING SERVICES AT TERMINAL OF MOBILE COMMUNICATION SYSTEM

(75) Inventors: Sung Won Lee, Seoul (KR); Han Na Lim, Seoul (KR); Beom Sik Bae, Suwon-si (KR)

(73) Assignees: Samsung Electronics Co., Ltd., Suwon-si (KR); Kyung Hee University Industry Academic Cooperation Foundation, Yongin-si (KR)

( * ) Notice: Subject to any disclaimer, the term of this patent is extended or adjusted under 35 U.S.C. 154(b) by 116 days.

(21) Appl. No.: 13/814,927

(22) PCT Filed: Aug. 9, 2011

(86) PCT No.: PCT/KR2011/005778
§ 371 (c)(1),
(2), (4) Date: Feb. 7, 2013

(87) PCT Pub. No.: WO2012/020958
PCT Pub. Date: Feb. 16, 2012

(65) Prior Publication Data
US 2013/0136096 A1    May 30, 2013

(30) Foreign Application Priority Data

Aug. 13, 2010  (KR) .......................... 10-2010-0078117

(51) Int. Cl.
*H04W 4/00* (2009.01)
*H04W 72/04* (2009.01)
*H04W 8/04* (2009.01)
*H04W 60/00* (2009.01)

(52) U.S. Cl.
CPC ............... *H04W 72/04* (2013.01); *H04W 8/04* (2013.01); *H04W 60/00* (2013.01); *H04W 4/005* (2013.01)

(58) Field of Classification Search
CPC ................................ H04W 76/02; H04W 8/02
See application file for complete search history.

(56) References Cited

U.S. PATENT DOCUMENTS

| | | | |
|---|---|---|---|
| 2004/0202126 A1* | 10/2004 | Leung et al. | 370/331 |
| 2005/0013280 A1* | 1/2005 | Buddhikot et al. | 370/349 |
| 2008/0214190 A1* | 9/2008 | Aalto | 455/435.1 |
| 2008/0274736 A1* | 11/2008 | Hu | 455/433 |
| 2008/0316972 A1* | 12/2008 | Shaheen | 370/331 |
| 2010/0040020 A1* | 2/2010 | Chen | 370/331 |
| 2011/0171958 A1* | 7/2011 | Hua et al. | 455/435.2 |
| 2011/0280217 A1* | 11/2011 | Drevon et al. | 370/331 |

FOREIGN PATENT DOCUMENTS

EP          1727329 A1          11/2006

* cited by examiner

*Primary Examiner* — Chi H Pham
*Assistant Examiner* — Fahmida Chowdhury
(74) *Attorney, Agent, or Firm* — Jefferson IP Law, LLP

(57) ABSTRACT

The present relates to a method for providing a terminal with a service in a mobile communication system which includes transmitting to mobility management entity an attach request message for initiating registration of the terminal having a virtual IP address with the mobile communication system; registering, at the mobility management entity, location of the terminal with a home subscriber server; and completing the registration by transmitting an attach accept message from the mobility management entity to the terminal. The present invention is capable of registering a terminal with a mobile communication system initially without bearer path and IP address allocation and, when a packet address to the terminal occurs, allocating the radio resource, bearer resource, and IP address through paging procedure, thereby proving the UE with the service.

20 Claims, 39 Drawing Sheets

FIG. 23

| ATTACH REQ (New Attach Modes) | |
|---|---|
| General Attach | Mobility Support |
| 1 | 0 |
| 0 | 1 |
| 0 | 0 |

FIG. 24

| Termination Type [New Paging Modes] | |
|---|---|
| IP Address Assigned | IP Address Requested |
| 1 | 0 |
| 0 | 1 |

FIG. 25

| Virtual Fixed IP Address | MME Identifier | Black-list IP Address | White-list IP Address |
|---|---|---|---|
| SERVING CONTROL REQ (New Paging Modes) | | | |
| VFIP_A | MME_1 | IP1/IP2/... | IP7/IP8/... |

FIG. 27

| UE Identifier | MME Identifier | Attach Mode | Virtual Fixed IP Address | Allocated Real IP Address | Black-list IP Address | White-list IP Address | SGW Identifier | PGW Identifier |
|---|---|---|---|---|---|---|---|---|
| | | | | | | HSS Database Enhancement (New Attach Modes, IP Address Management and Dedicated SGW/PGW Allocation) | | |
| UE_1 | MME_1 | 10 | VFIP_A | RIP_A | IP1/IP2/... | IP7/IP8/... | SGW_1 | PGW_1 |
| UE_2 | MME_2 | 01 | VFIP_B | - | IP3/IP4/... | IP6/IP5/... | SGW_2 | PGW_2 |
| UE_3 | MME_3 | 00 | VFIP_C | - | IP5/IP6/... | IP4/IP3/... | - | - |

FIG. 28

| UE Identifier | Attach Mode | Location Tracking | HSS Identifier (optional) | SGW Identifier | PGW Identifier |
|---|---|---|---|---|---|
| UE_1 | 10 | Activated | HSS_1 | SGW_1 | PGW_1 |
| UE_2 | 01 | Activated | HSS_2 | SGW_2 | PGW_2 |
| UE_3 | 00 | Deactivated | HSS_3 | - | - |

MME Database Enhancement (New Attach Modes)

FIG. 29

| UE Identifier | MME Identifier | Allocated Real IP Address | SGW Identifier | Virtual Fixed IP Address | Black-list IP Address | White-list IP Address | HSS Identifier (optional) |
|---|---|---|---|---|---|---|---|
| | | | | | | | |
| UE_1 | MME_1 | RIP_A | SGW_1 | VFIP_A | IP1/IP2/... | IP7/IP8/... | HSS_1 |
| UE_2 | MME_2 | - | SGW_2 | VFIP_B | IP3/IP4/... | IP6/IP5/... | HSS_2 |
| UE_3 | MME_3 | - | - | VFIP_C | IP5/IP6/... | IP4/IP3/... | HSS_3 |

PGW Database Enhancement
(New Attach Modes, IP Address Management and Dedicated SGW/PGW Allocation)

METHOD AND APPARATUS FOR PROVIDING SERVICES AT TERMINAL OF MOBILE COMMUNICATION SYSTEM

BACKGROUND OF THE INVENTION

1. Field of the Invention

The present invention relates to a method and apparatus for providing a User Equipment with a service in a mobile communication system. In particular, the present invention relates to a method and apparatus for registering a User Equipment with the mobile communication system initially without bearer path and IP address allocation and, when a packet addressed to the User Equipment occurs, allocating radio resource and bearer resource and IP address to the User Equipment through a paging procedure.

2. Description of the Related Art

Mobile communication systems developed to provide the subscribers with voice communication services on the move. With the rapid advance of technologies, the mobile communication systems have evolved to support high speed data communication services as well as the standard voice communication services. However, the limited resource and user requirements for higher speed services in the current mobile communication system spurs the evolution to more advanced mobile communication system.

Recently, as one of the next generation mobile communication systems, Long Term Evolution (LTE) is on the standardization by the 3$^{rd}$ Generation Partnership Project (3GPP). LTE is a technology designed to provide high speed packet-based communication of up to 100 Mbps. In order to meet this requirement, several schemes are being discussed: one scheme for reducing the number of nodes located in a communication path by simplifying a configuration of the network, and another scheme for maximally approximating wireless protocols to wireless channels.

Meanwhile, there is many discussions on Machine Type Communication (MTC) devices. An MTC is a form of data communication between machines without mobility unlike the mobile communication. The terminals capable of MTC may include a fixedly-installed vending machine, an indoor electronic appliance, a security monitoring camera, etc.

However, the increase of the number of MTC devices accelerates the IP address shortage problem and thus there is a need of counterplan.

DISCLOSURE OF INVENTION

Technical Problem

The present invention has been made in an effort to solve the above problem and it is an object of the present invention to provide a method and apparatus for providing a service of registering a UE with the mobile communication system initially without bearer path and IP address allocation and allocating, when a packet addressed to the UE occurs, bearer resource and IP address, resulting in mitigation of IP address shortage.

In order accomplish this, the present invention defines a new UE state for MTC device to perform always-on economically based on the MTC device and service characteristics and proposes a new MTC UE registration procedure and technology.

Also, it is another object of the present invention to provide a method and apparatus for performing MTC Device Terminated paging and establishing IP bearer connection for the MTC device without being allocated an IP address in a dedicated packet-switched mobile communication technology of LTE.

Solution to Problem

In order to solve the above problem, a method for providing a terminal with a service in a mobile communication system includes transmitting to mobility management entity an attach request message for initiating registration of the terminal having a virtual IP address with the mobile communication system; registering, at the mobility management entity, location of the terminal with a home subscriber server; and completing the registration by transmitting an attach accept message from the mobility management entity to the terminal.

Preferably, the method further includes generating, when a Packet Data Network (PDN) gateway receives a packet addressed to the terminal from a peer node, a downlink data notification message; transmitting the downlink data notification message to the mobility management entity; and allocating, at the mobility management entity, radio resource, bearer resource, and IP address to the terminal by paging the terminal.

Meanwhile, an apparatus for providing a terminal with a service in a mobile communication system includes a terminal which is allocated a virtual IP address and transmits an attach request message for initiating registration with the mobile communication system; and a mobility management entity which registers, when the attach request message is received, location of the terminal with a home subscriber server, completes the registration by transmitting an attach accept message to the terminal.

Preferably, the apparatus further includes a Packet Data Network (PDN) gateway which generates, when a Packet Data Network (PDN) gateway receives a packet addressed to the terminal from a peer node, a downlink data notification message, transmits the downlink data notification message to the mobility management entity, and allocates, at the mobility management entity, radio resource, bearer resource, and IP address to the terminal by paging the terminal.

Advantageous Effects

The present invention is capable of registering a UE with a mobile communication system initially without bearer path and IP address allocation and, when a packet address to the UE occurs, allocating the radio resource, bearer resource, and IP address through paging procedure, thereby proving the UE with the service. Accordingly, it is possible to solve the IP address shortage problem caused by the increase of UEs, particularly, MTC UEs.

BRIEF DESCRIPTION OF THE DRAWINGS

FIG. 23 is a diagram illustrating the attach request message format including new fields according to an embodiment of the present invention;

FIG. 24 is a diagram illustrating an additional message field for paging the UE 910 according to an embodiment of the present invention;

FIG. 25 is a diagram illustrating a field included in a serving control request message for paging the UE 910 according to an embodiment of the present invention;

FIG. 27 is a diagram illustrating a database field added to HSS 960 according to an embodiment of the present invention;

FIG. 28 is a diagram illustrating a database field added to MME 950 according to an embodiment of the present invention;

FIG. 29 is a diagram illustrating a database field added to P-GW 940 according to an embodiment of the present invention;

DETAILED DESCRIPTION OF EXEMPLARY EMBODIMENTS

Although the description is directed to an immobile MTC device as the UE, the present invention is not limited thereto but can be applied to the normal mobile communication UE.

Exemplary embodiments of the present invention are described with reference to the accompanying drawings in detail. The same reference numbers are used through the drawings to refer to the same or like parts. Detailed description of well-known functions and structures incorporated herein may be omitted to avoid obscuring the subject matter of the present invention.

In the following, the description is made on the basis of $3^{rd}$ Generation Partnership Project (3GPP) Long Term Evolution (LTE) network architecture and terminology. However, the present invention is not limited to the LTE communication network but can be applied to other mobile communication technology-based networks.

Figure 1:
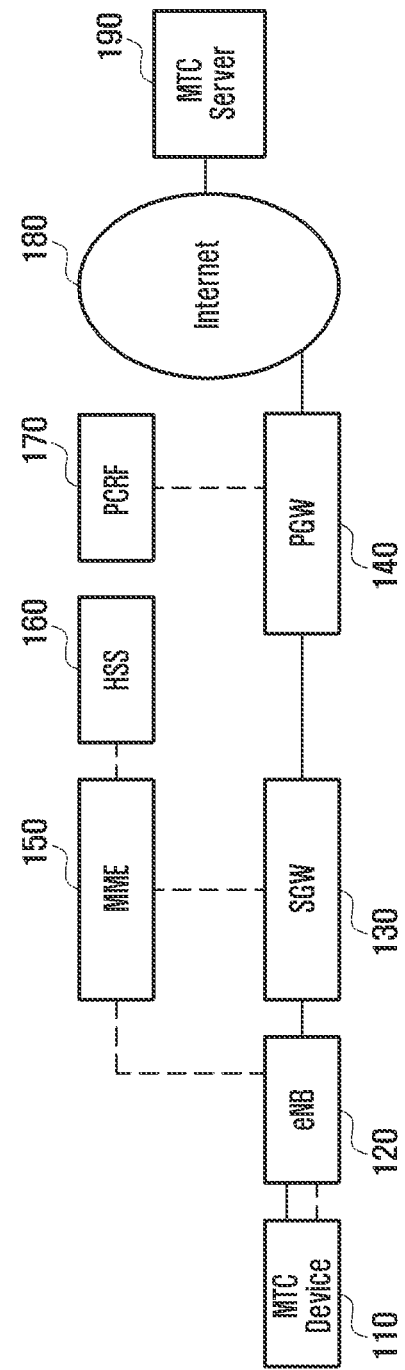
FIG. 1 is a block diagram illustrating a structure of a conventional mobile communication system, especially, an LTE system.

FIG. 1 is a block diagram illustrating a structure of a conventional mobile communication system, especially, an LTE system.

In LTE, an MTC device 110 using the mobile communication network and an MTC server 190 for transmitting to the corresponding MTC device and collecting information from the corresponding device are located at both ends of the network. The server 190 may be connected to a mobile communication network through Internet as well as the operator network. FIG. 1 is directed to the latter model, i.e. the case where the server 190 is connected to the mobile communication network via Internet.

As shown in FIG. 1, the LTE system includes an eNB 120 responsible for controlling radio communication, a Serving Gateway (S-GW) 130 responsible for delivering bearer traffic of UE, and a PDN Gateway (P-GW) 140 responsible for allocating and managing IP address as a connection point of the bearer. On the control plane, there is a Mobility Management (MME) 150 for managing mobility of the UE 110 and Home Subscriber Server (HSS) 160 as a database for managing subscriber information of the corresponding UE 110. The LTE system further includes a Policy Charging Resource Function (PCRF) 170 for storing and managing service contracts in the case of requiring differentiated service quality.

In the following, descriptions are made of the maintain entities with reference to FIG. 1. In this case, each entity is provided with a communication transmission/reception device for processing communication protocol with a peer device through a certain interface and a database for building and managing information its own interface protocol processor. In the case of bearer plane device, it is provided with a data buffer for buffering and processing traffic.

Figure 2:
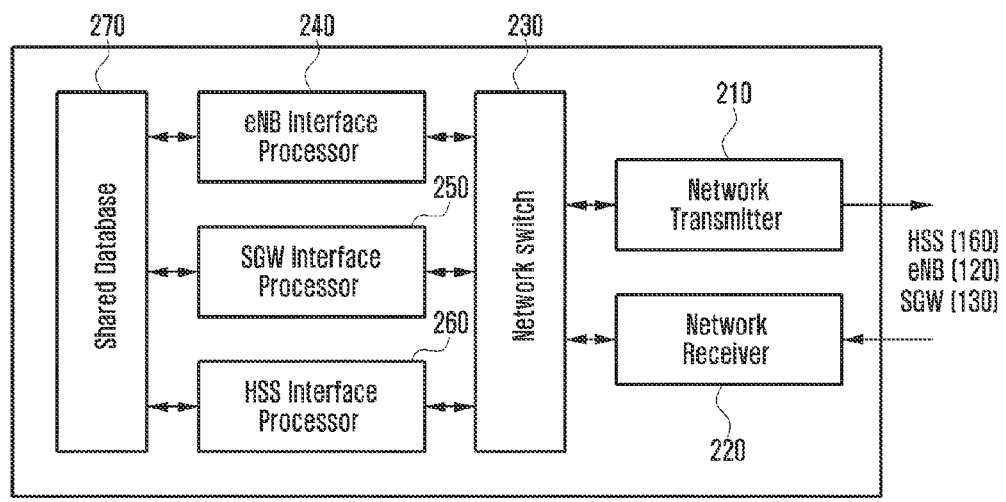
FIG. 2 is a block diagram illustrating the configuration of the conventional MME 150.

FIG. 2 is a block diagram illustrating the configuration of the conventional MME 150.

The network transmitter and receiver 210 and 220 and the network switch 230 processes the communication protocol with a peer device having the corresponding interface.

As shown in FIG. 2, the MME 150 communicates with the HSS 160, eNB 120, and S-GW 130 and includes interface protocol processers for processing the communication protocols with the peer device. That is, the MME includes an eNB interface processor 240 for processing the communication protocol with the eNB 120, a serving gateway interface processor 250 for processing the communication protocol with the S-GW 130, and a HSS interface processor 260 for processing the communication protocol with the HSS 160.

The database 270 stores the programs and data necessary for performing general operations of the MME 150.

Figure 3:
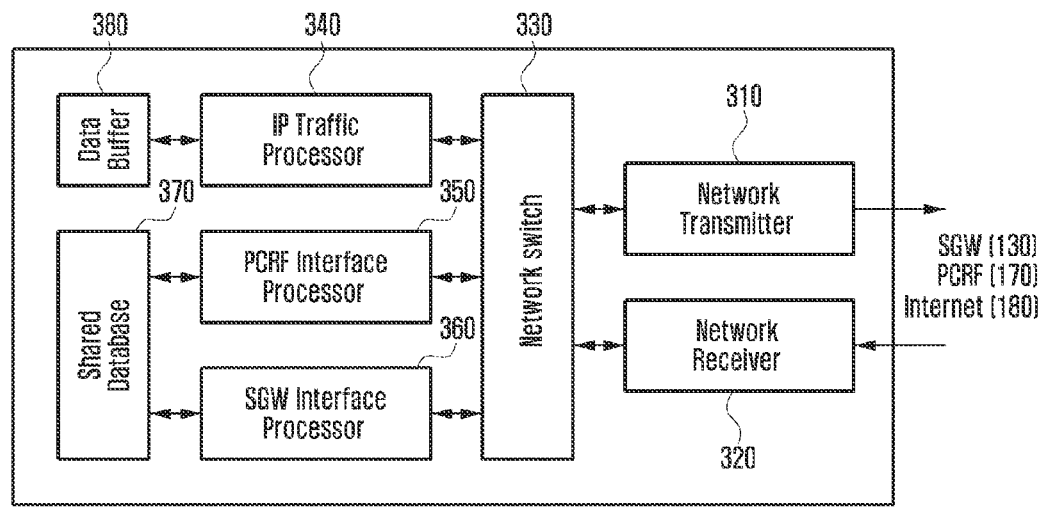
FIG. 3 is a block diagram illustrating the configuration of the conventional P-GW 140.

FIG. 3 is a block diagram illustrating the configuration of the conventional P-GW 140.

The network transmitter and receiver 310 and 320 and the network switch 330 process the communication protocols with peer devices.

As shown in FIG. 3, the P-GW 140 communicates with the S-GW 130, PCRF 170, and Internet 180 and is provided with respective interface protocol processors for processing the communication protocols with the peer devices. That is, the P-GW 140 includes an IP traffic interface processor 340 for processing the communication protocol with the Internet 180, a PCRF interface processor 350 for processing the communication protocol with the PCRF 170, and an S-GW gateway interface processor 360 for processing the communication protocol with the S-GW 130.

The database 270 stores programs and data necessary for general operations of the P-GW 140.

The P-GW 140 is a connection point of the UE 110 and a device to and from which real IP traffic is input and output, and thus the P-GW 140 includes a data buffer 380 for the IP traffic.

Figure 4:
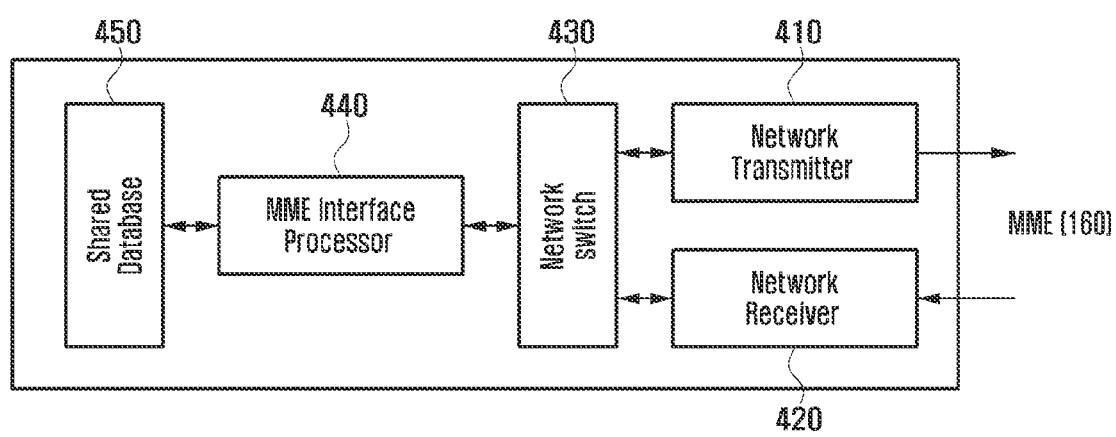
FIG. 4 is a block diagram illustrating the configuration of the conventional HSS 160.

FIG. 4 is a block diagram illustrating the configuration of the conventional HSS 160.

The network transmitter and receiver 410 and 420 and the network switch 430 processes the communication protocol with a peer device having the corresponding interface.

As shown in FIG. 4, the HSS 160 communicates with the MME 150 and includes respective interface protocol processors for processing the communication protocols with the peer devices. That is, the HSS 160 includes the MME interface processor for processing the communication protocol with the MME 160.

The database 450 stores the programs and data necessary for processing generation operations of the HSS 160.

Figure 5:
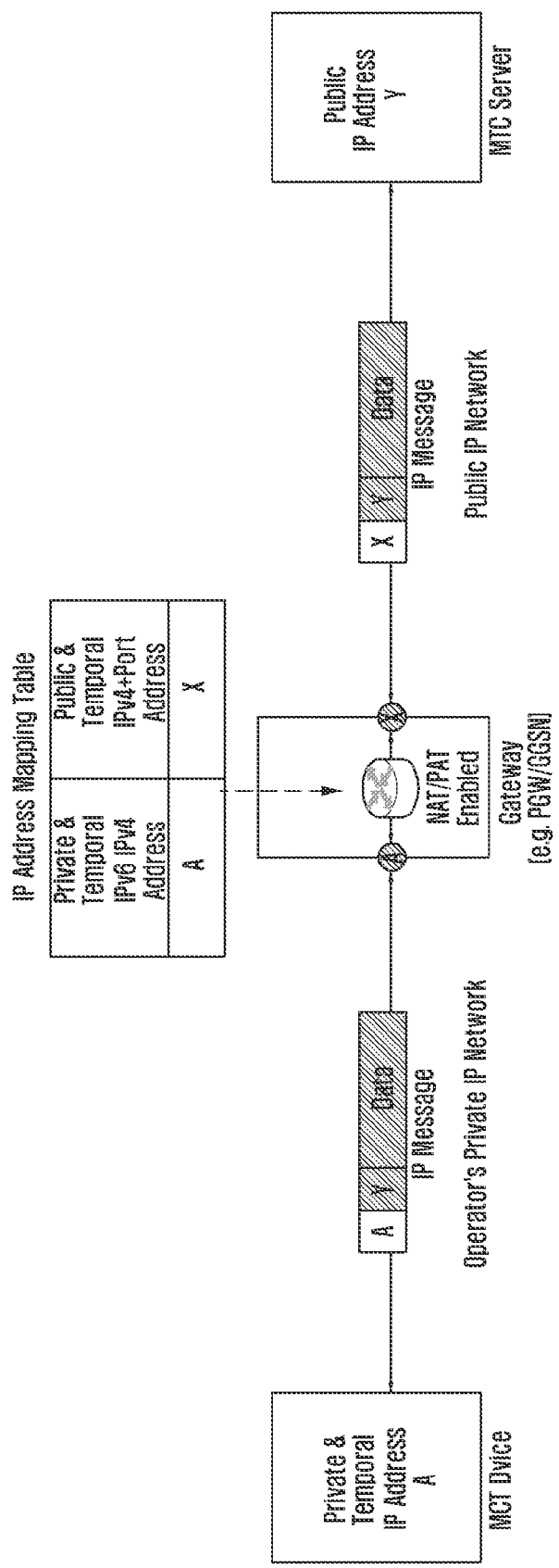
FIG. 5 is a block diagram illustrating the operation principle of the conventional IP allocation-based communication method.
Figure 6:
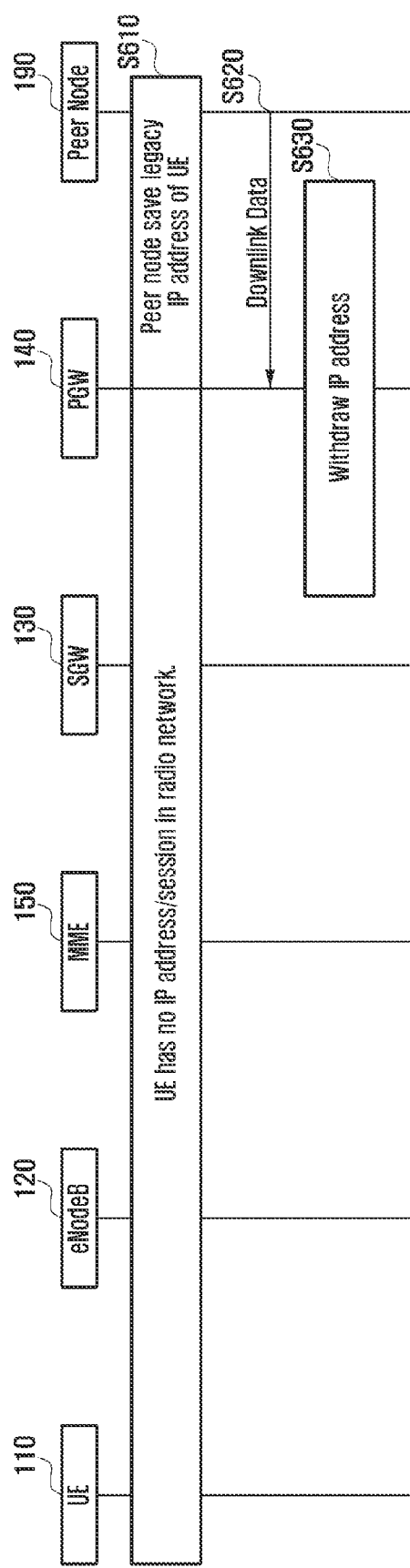
FIG. 6 is a signal flow diagram illustrating operation procedure in case of no IP address is allocated in the conventional method.

FIG. 5 is a block diagram illustrating the operation principle of the conventional IP allocation-based communication method.

As shown in FIG. 5, the UE is allocated a private and temporary IP address (A) and the server is assigned a common IP address (Y) before they start communication. In this case, the private and temporary IP address (A) has a common and temporary address (X) mapped thereto and the mapping relationship is retained in the gateway. When a message or a packet is transmitted from the UE to the server, the gateway converts the UE's temporary IP address (A) to the common and temporary address (X) to deliver the message or packet. Also, when a message or a packet is transmitted from the gateway to the server, the gateway converts the common and temporary address (X) of the terminal to a temporary IP address (A) to deliver the message or packet.

In the conventional communication method, the UE 110 is allocated radio resource first to communicate with the mobile communication network. Since the conventional method supports the mobility of the UE 110 basically, it is performed periodically to track the location and update registration of the UE 100.

Particularly in the case of the UE 110 supporting only packet-service, the UE 110 has to be allocated an IP address. Accordingly, in order for the server to transmit information (MTC Device Terminated) at any time, the UE 110 has to be connected to the mobile communication network to receive mobility management service and allocated an IP address and occupy a process and memory for maintaining the corresponding IP address.

Since the IP address allocation is of allocating temporary address in the mobile communication system, the server 190 allocates the previously used temporary IP address to the UE 1010 or, in the case that the corresponding IP address is allocated to the UE 110 persistently but no radio resource is allocated and no IP bearer path is configured currently and thus it is impossible to transmit the information to the UE 110, the P-GW 140 as the contact point of the IP address withdraws the corresponding IP address (S630).

As described above, in the dedicated packet-switched mobile communication environment such as LTE, it is required for the UE to attach to the mobile communication network to be allocated radio resource such that the IP traffic with the IP address flows from the P-GW 140 to the UE 110 and maintain the radio resource for always-on.

Figure 7:
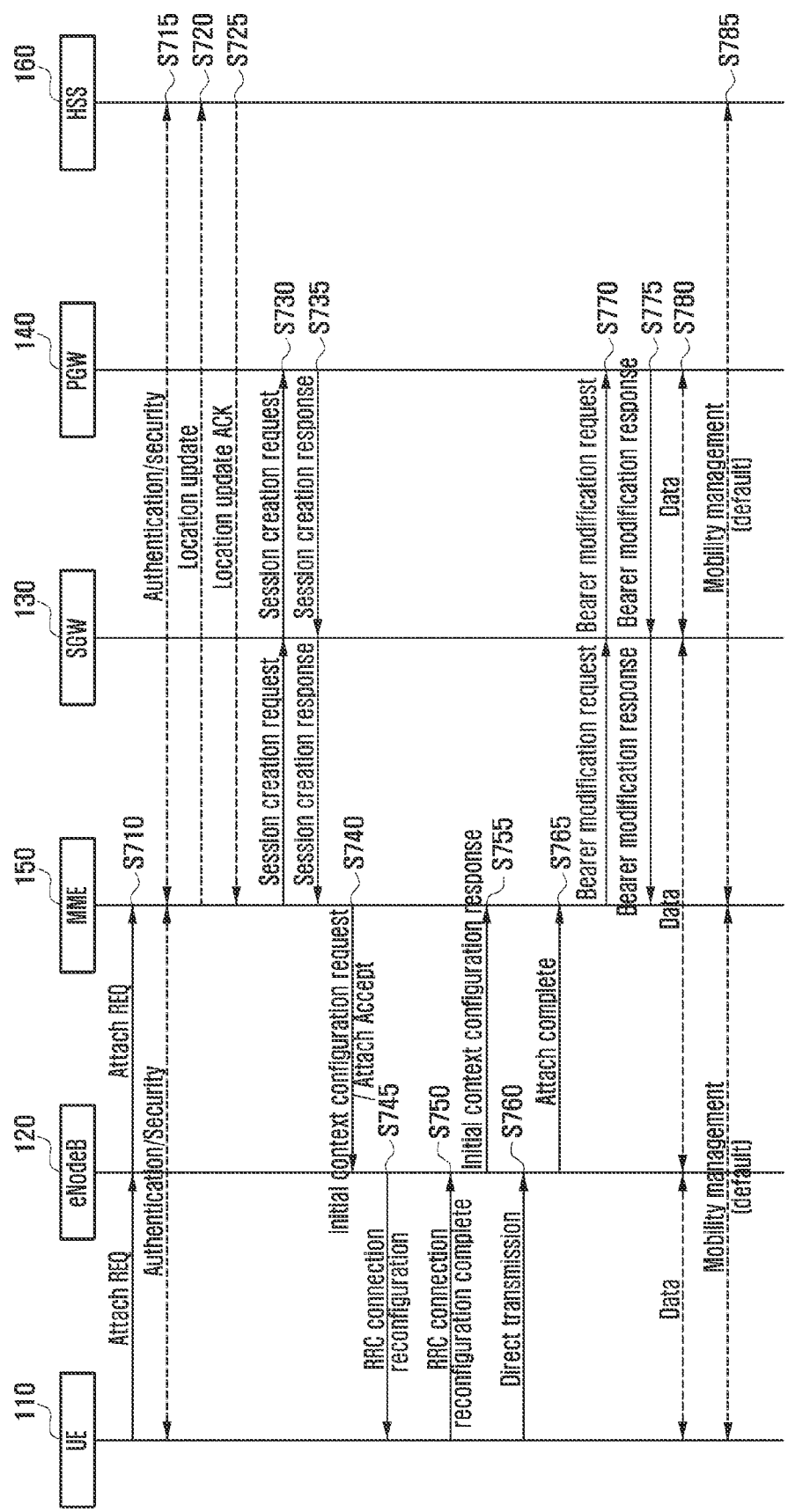
FIG. 7 is a flowchart illustrating the conventional procedure of allocating radio resource and IP path and address to the UE.

A description is made of the procedure of the conventional method for radio resource and IP path/address allocation to the UE with reference to FIG. 7. FIG. 7 is a flowchart illustrating the conventional procedure of allocating radio resource and IP path and address to the UE.

The UE 110 requests radio resource and IP address allocation as designed on the basis of the philosophy of human-centric service environment in which a person initiates an intended service. Accordingly, the UE 110 sends an Attach Request message to the MME 150 via the MME 120.

If the Attach Request message transmitted by the UE 110 is received, the MME 150 communicates with the HSS 160 and UE 110 to perform authentication/security procedure for testing availability and validity at steps S715 and 720. Next, the MME 150 performs update location request/acknowledge procedure for registering the UE's location with the HSS 160 at steps 720 and S725.

The MME 150 exchanges a Create Session Request/Response messages with the S-GW 130 and P-GW 140 perform bearer path establishment and IP address allocation to the attached UE 110 at steps S730 and S735. The MME 150 performs Initial Context Setup and Radio Resource Connection procedure for allocating radio resource through communication with the eNB 120 and the UE 110 at steps S740 to S765.

If the radio resource is allocated successfully, the MME 150, S-GW 130, and P-GW 140 exchange Modify Bearer Request/Response messages for adjusting the difference in radio resource and bearer path quality at steps S770 and S775.

Afterward, the mobile communication network checks the mobility of the UE 110 at steps S780 and S785.

Meanwhile, if the information exchange between the UE 110 and the network is skipped in the conventional mobile communication system, the radio resource is withdrawn while maintaining the IP address. This makes it possible for another user to reuse the radio resource. However, in order for the UE to receive an IP message, the IP address has to be maintained. If IP traffic addressed to the UE 110 occurs in the state that the radio resource is withdrawn while maintaining the IP address, the radio resource is recovered according to the procedure of FIG. 8.

Figure 8:
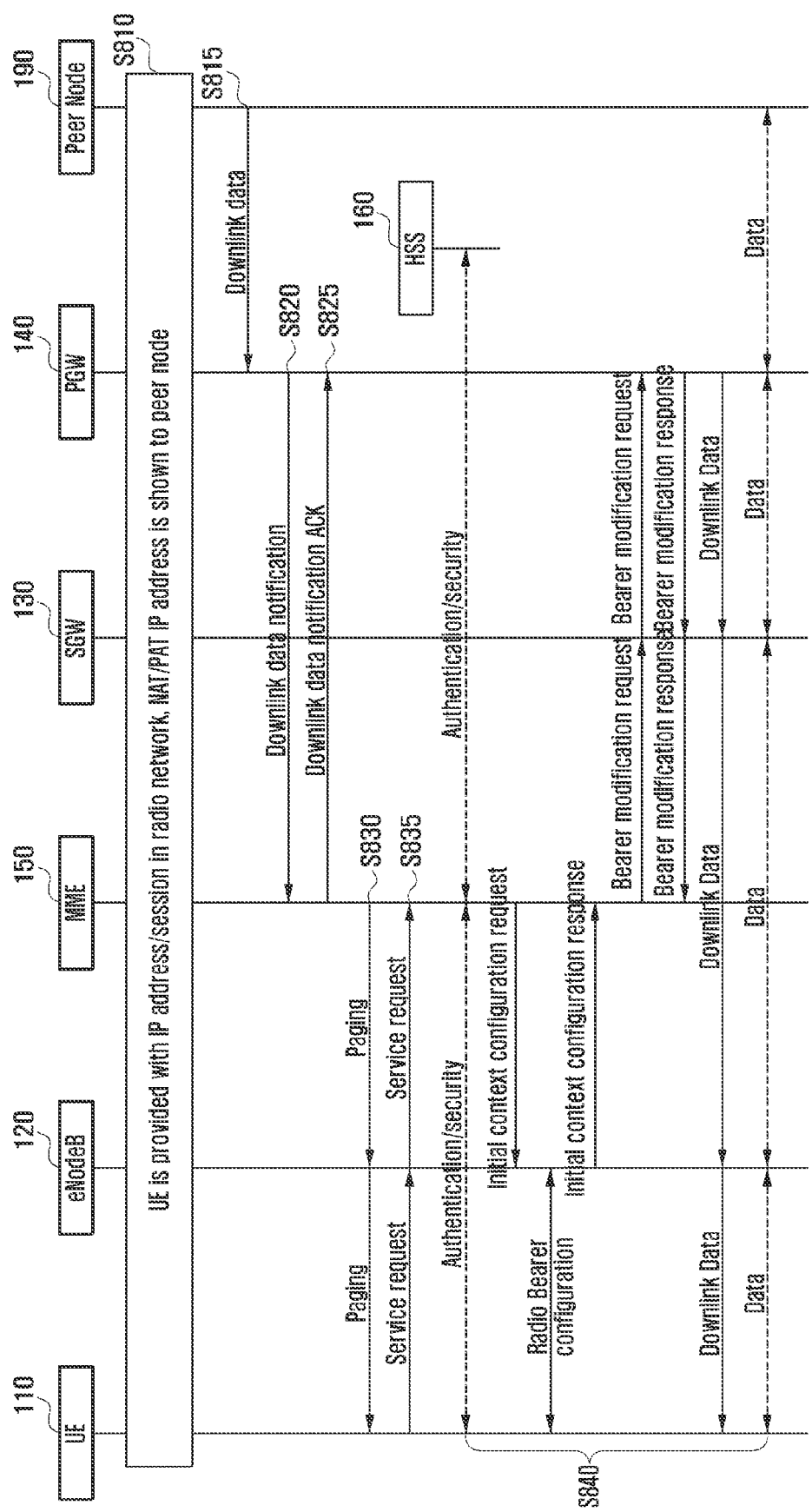
FIG. 8 is a signal flow diagram illustrating a paging procedure for the UE 110 allocated an IP address.

FIG. 8 is a signal flow diagram illustrating a paging procedure for the UE 110 allocated an IP address.

It is assumed that the IP address allocated through the registration procedure of FIG. 7 is maintained at step S810 even after the radio resource allocated to the UE 110 has been released.

Also, it is assumed that a data (or packet, traffic, etc.) addressed to the UE 110 is generated at a certain node (or server) 190 at step S815. The data is transferred to the P-GW 140 as the connection point of the UE 110 and the node 190, and upon receipt of the data the P-GW 140 sends the MME 150 a Downlink Data Notification message at step S820 to page the UE 110. The MME 150 sends a Downlink Data Notification ACK message to the P-GW 140 and pages the UE 110 via the eNB 120 at step S830.

The UE 110 transmits a Service Request at step S835 so as to trigger the radio resource recovery procedure. The radio resource recovery procedure S840 is similar to the registration procedure of the UE 110 as shown in FIG. 7 with the exception that session establishment procedure for IP address acquisition and PGW allocation is not performed.

Firstly, one of the drawbacks of the conventional method is that the processing and memory load is so large for supporting the always-on of all UEs in the mobile communication network. The persistent UE IP address allocation and maintenance causes the processing and memory load of the S-GW 130 and P-GW 140 and the location tracking and management of the fixedly installed UE 110, particularly the MTC device, incurs unnecessary processing and memory load of the MME 150, eNB 120, and HSS 160.

Particularly, although the mobile communication-based MTC service is widespread, it may be impossible to provide economically efficient MTC business by taking notice of the case such as smart meter which is fixedly installed and transmits/receive small amount of information monthly.

Thus, there is a need of an improved method that is capable of meeting the economic efficiency of accommodation of the large amount of MTC devices even in view of the mobile operator by reducing or removing the load caused by the IP address and bearer management.

Secondly, the conventional method assumes the Internet address mapped to the IP address used by the UE 110 one by one presents the corresponding address to the UE 110 on Internet. However, the IPv4 addresses are not enough to support always-on of the UEs, particular MTC devices, growing exponentially in number. Introducing IPv6 means replacing the legacy facilities with new ones which is a difficult scenario in the short or middle run and thus there is a need of a counterplan for always-on of the MTC devices. Particularly in the MTC model, since the UE-terminated traffic is important as well as the UE-oriented traffic in the human-centric mobile communication concept, it is also very important to support the always-on.

In order to support the MTC service efficiently in mobile communication, it is required to introduce a new IP address management policy and define differentiate mobile UE states and operations by taking notice of the MTC device characteristics. Particularly, it is restricted to realize the service model such as smart grid due to the high cost in the current mobile communication billing policy and thus there is a need of cost-effective technology model competitive in view of mobile operator and MTC service provider.

In order to solve this problem, the present invention provides a method and apparatus for registering a UE with the mobile communication system without bearer path and IP address allocation initially and, when a packet addressed to the UE occurs afterward, allocating radio resource, bearer resource, and IP address through a paging process to provide the UE with the service, as described hereinafter in detail.

Figure 9:
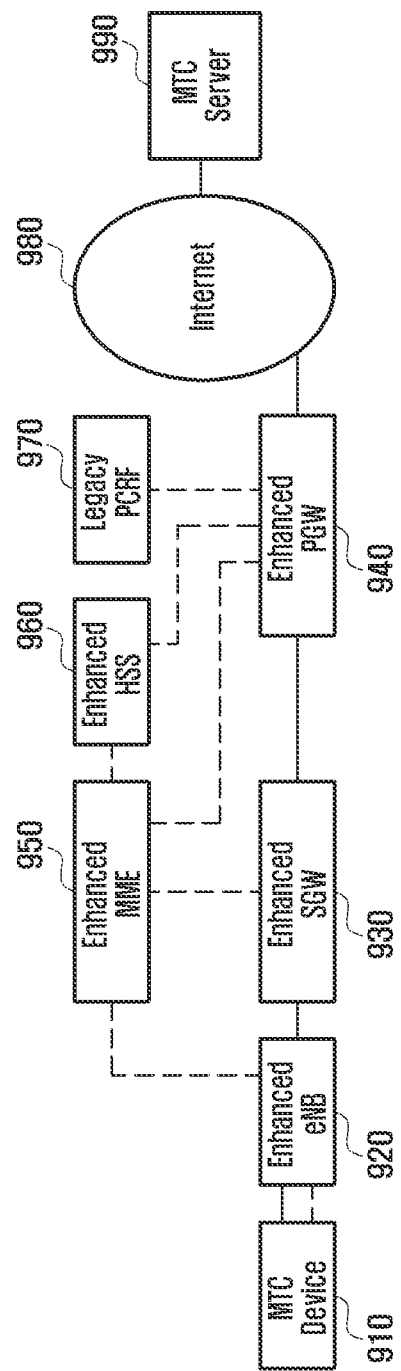
FIG. 9 is a diagram illustrating the architecture of a mobile communication system according to an embodiment of the present invention.

FIG. 9 is a diagram illustrating the architecture of a mobile communication system according to an embodiment of the present invention.

Figure 10:
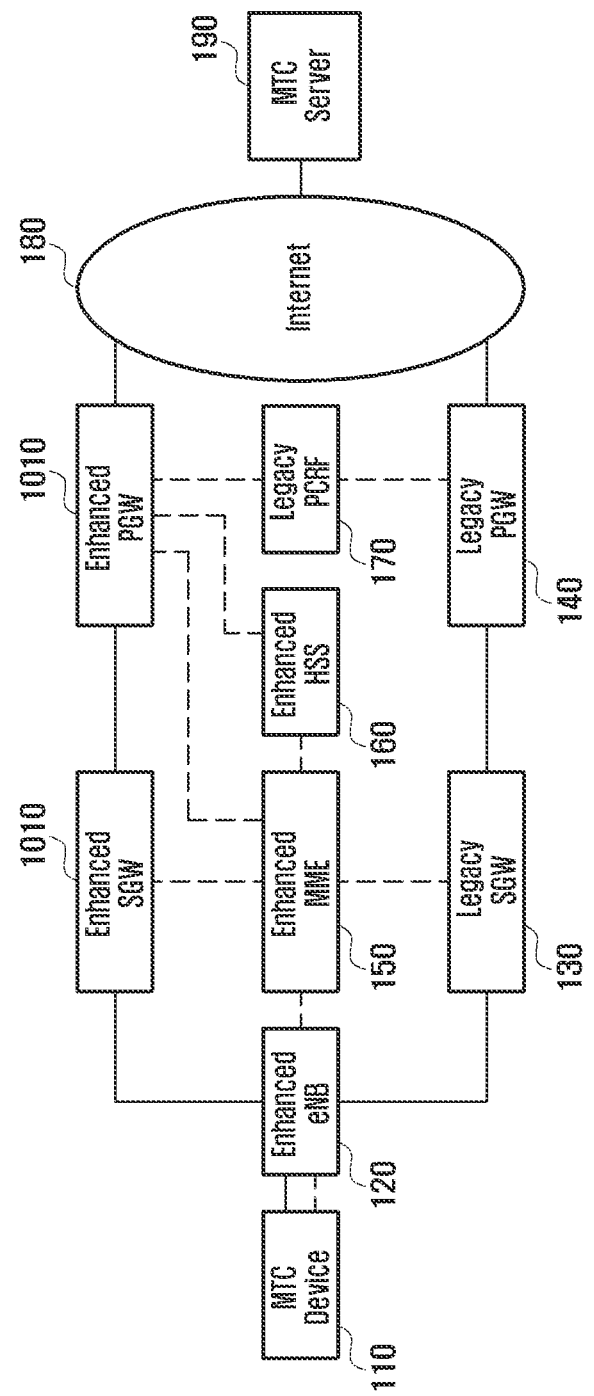
FIG. 10 is a diagram illustrating the architecture of a mobile communication system having MTC traffic-dedicated P-GW 1020 and S-GW 1010.

FIG. 9 is directed to the mobile communication system according to an embodiment of the present invention in which novel functions are added to the corresponding nodes of the conventional mobile communication system. Accordingly, the conventional LTE communication devices are upgraded to support the functions proposed in the present invention. In the mobile communication system depicted in FIG. 9, the P-GW 940 is provided with the interface for communication with MME 950 and HSS 960. The mobile communication system of FIG. 9 is structured to support the conventional human-centric traffic and the MTC traffic within a network and, as shown in FIG. 10, may be implemented with P-GW 1020 and S-GW 1010 dedicated to the MTC traffic from an evolutionary view point.

Figure 11:
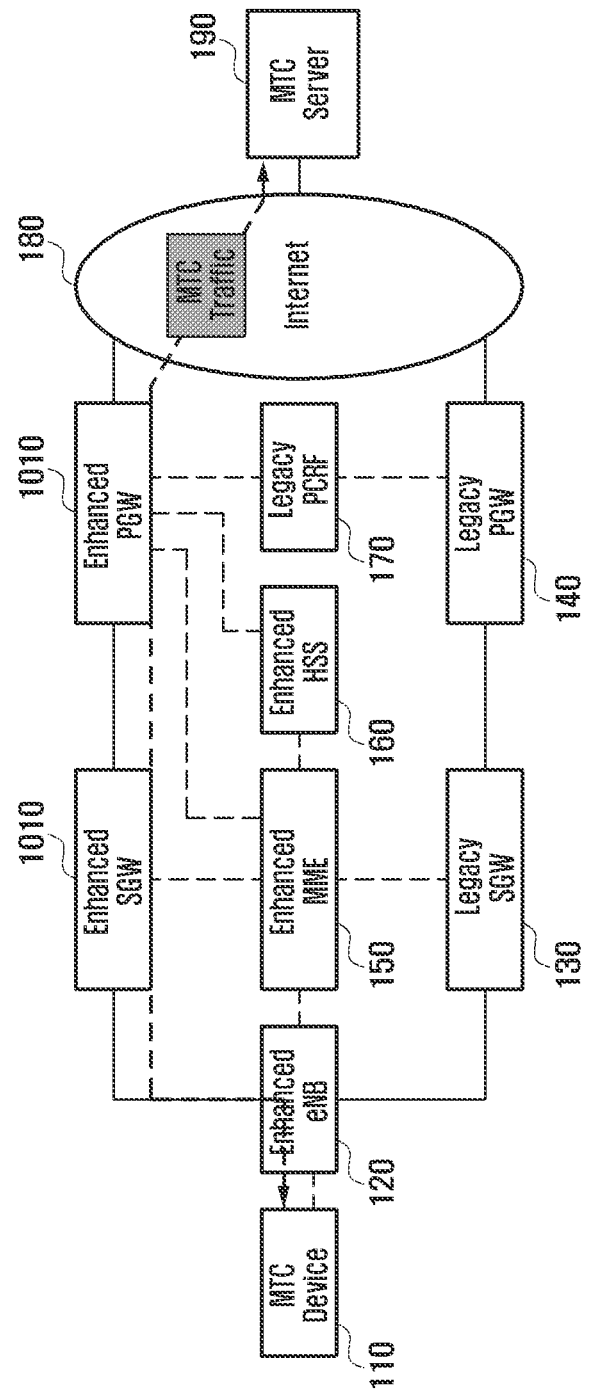
FIG. 11 is a diagram illustrating the path of MTC traffic via dedicated P-GW and S-GW according to an embodiment the present invention.

In this way, the devices proposed in the present invention are capable of being installed in separation from the legacy devices without influence of the conventional human-centric traffic to the MTC traffic. In this case, the MTC traffic is transferred to the dedicated P-GW and S-GW as shown in FIG. 11.

A description is made of the UE registration and paging procedure in the mobile communication system architecture depicted in FIG. 9. However, the present invention is not limited thereto, but the same principle and procedure can be applied to the architecture depicted in FIG. 10.

Descriptions are made of the individual configurations of the individual nodes according to embodiments of the present invention.

Figure 12:
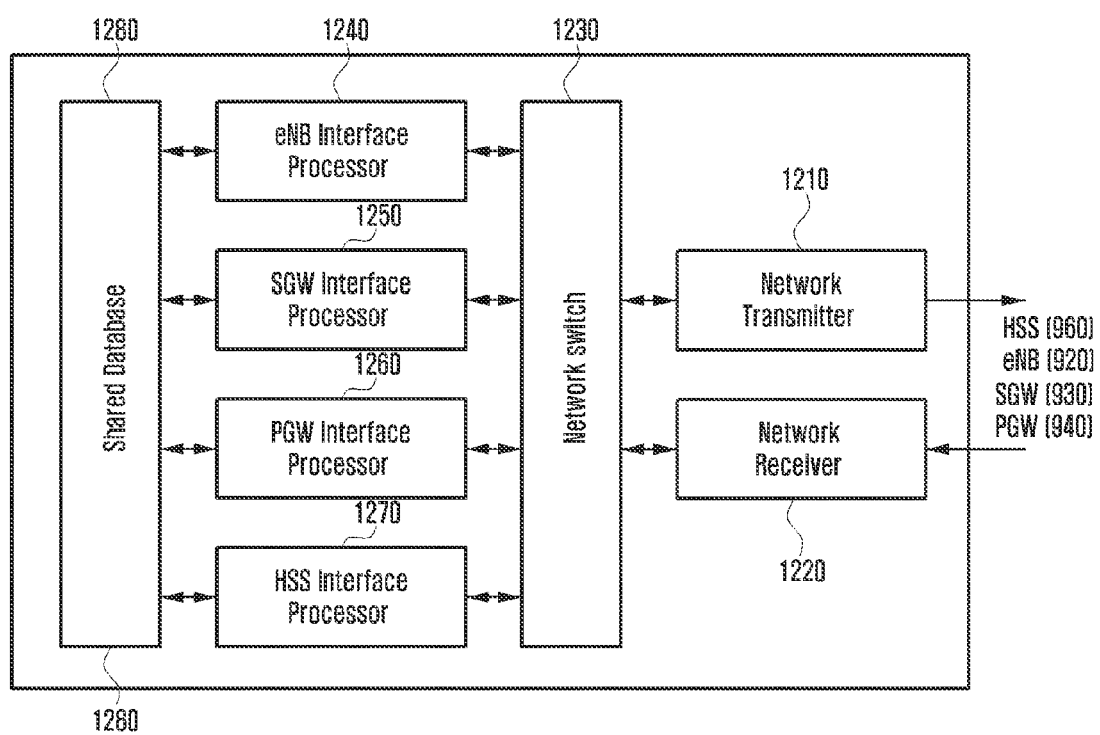
FIG. 12 is a block diagram illustrating the configuration of the MME 950 according to an embodiment of the present invention.

FIG. 12 is a block diagram illustrating the configuration of the MME 950 according to an embodiment of the present invention.

The configuration of the MME 950 of the present invention, as shown in FIG. 12, is similar to that of the conventional MME 150 as shown in FIG. 2. However, the MME 950 of the present invention is provided with a P-GW interface processor 1260 for processing the communication protocol with the P-GW 940 to provide an interface for communication with the P-GW 940.

Figure 13:
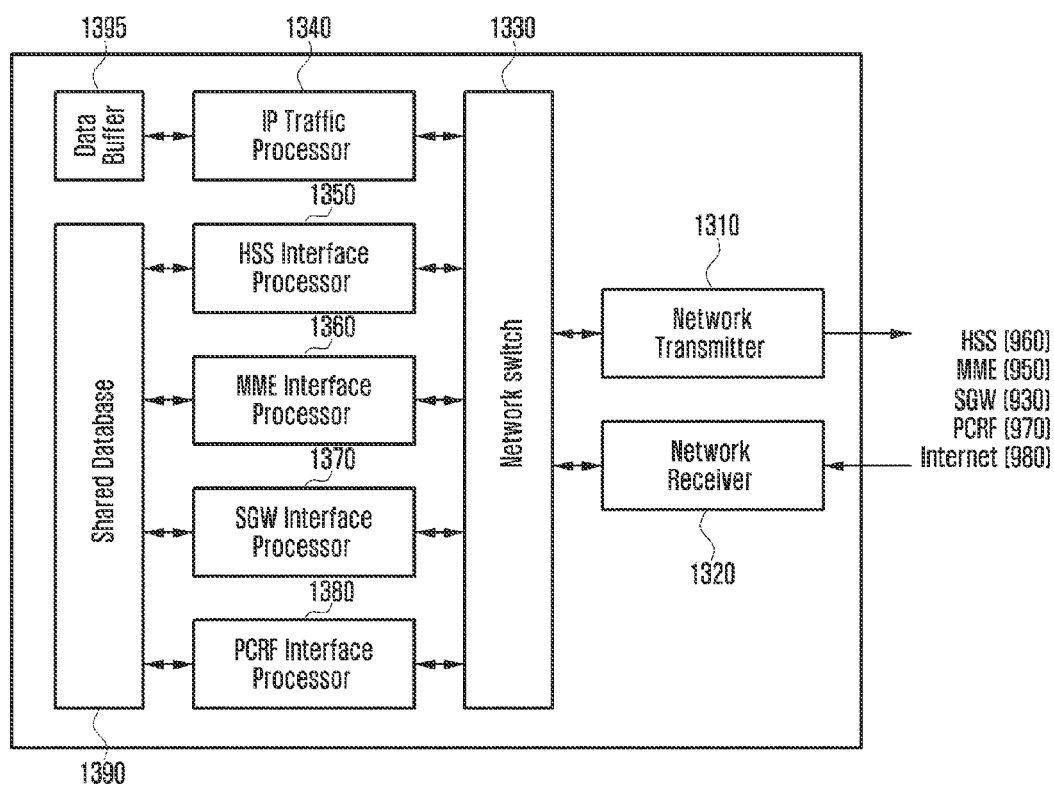
FIG. 13 is a block diagram illustrating the configuration of the P-GW 940 according to an embodiment of the present invention.

FIG. 13 is a block diagram illustrating the configuration of the P-GW 940 according to an embodiment of the present invention.

The configuration of the P-GW 940 of the present invention, as shown in FIG. 13, is similar to that of the conventional P-GW 940 as shown in FIG. 3. However, the P-GW 940 of the present invention is provided with an MME interface processor 1360 for processing the communication protocol with the MME 950 and an HSS interface processor 1350 for processing the communication protocol with the HSS 960 to provide interfaces for communications with the MME 950 and HSS 960 respectively.

Figure 14:
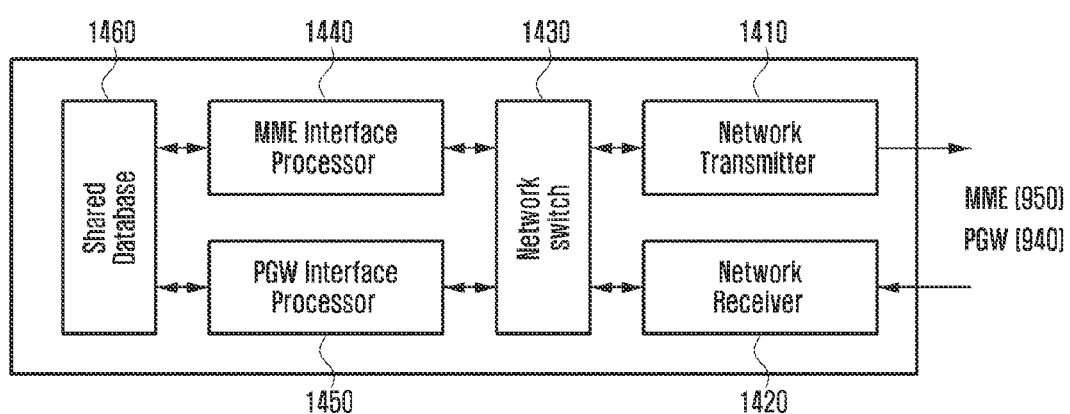
FIG. 14 is a block diagram illustrating the configuration of the HSS 960 according to an embodiment of the present invention.

FIG. 14 is a block diagram illustrating the configuration of the HSS 960 according to an embodiment of the present invention.

The configuration of the HSS 960 of the present invention, as shown in FIG. 14, is similar to that of the conventional HSS 160 depicted in FIG. 4. However, the HSS 960 of the present invention is provided with a P-GW interface processor 1450 for processing the communication protocol with the P-GW 940 to provide the interface for communication with the P-GW 940.

Figure 15:
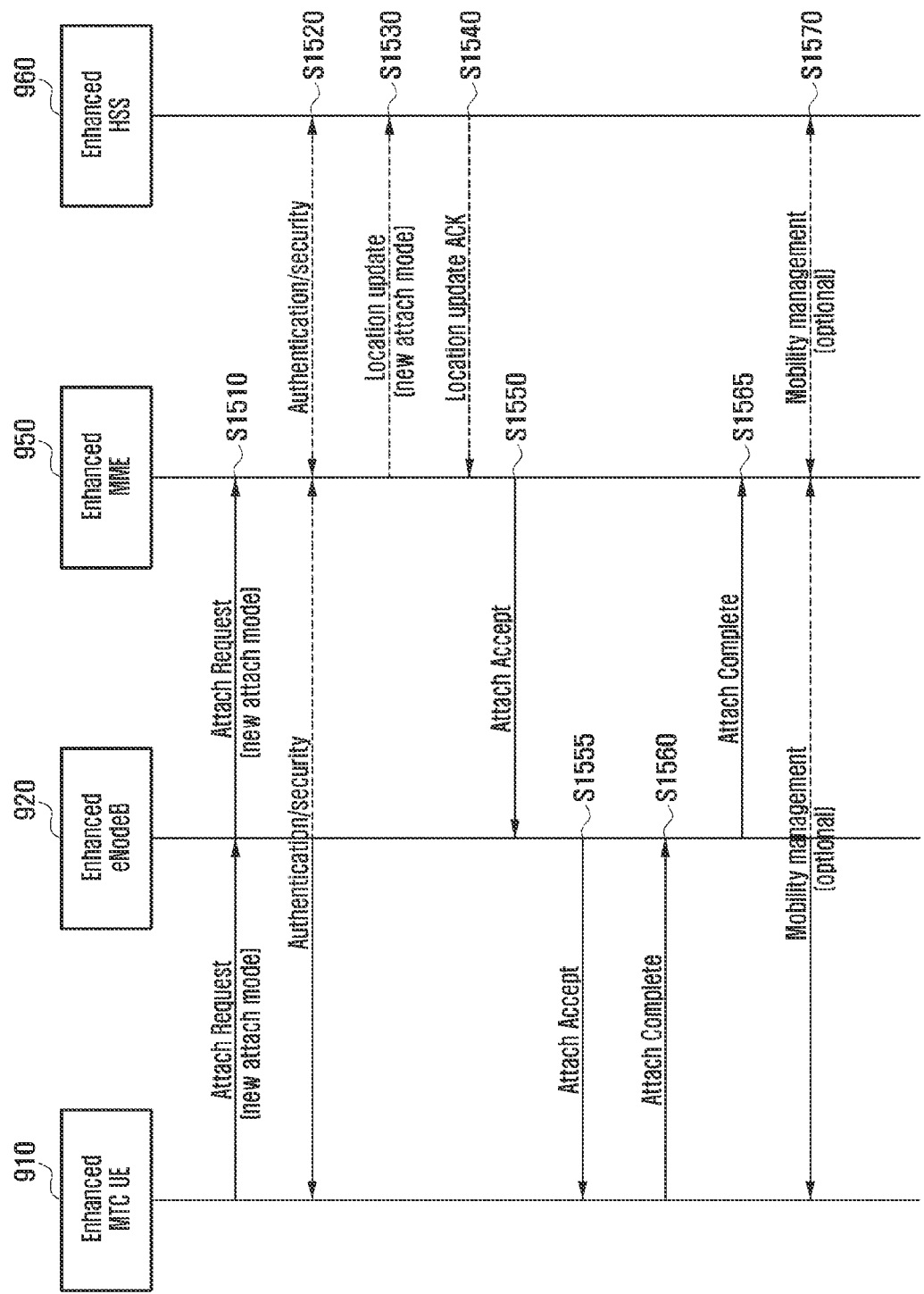
FIG. 15 is a signal flow diagram illustrating the registration procedure of the UE 910 according to an embodiment of the present invention.

FIG. 15 is a signal flow diagram illustrating the registration procedure of the UE 910 according to an embodiment of the present invention.

The registration procedure of the UE 910, as shown in FIG. 15, is simple as compared to the conventional UE registration procedure depicted in FIG. 7. This is because the UE registration procedure according to an embodiment of the present invention skips the bearer path configuration and IP address allocation which is default in the conventional UE registration procedure. Accordingly, the UE just notifies the mobile communication network of is power-on state and its current location.

The UE 910 sends an Attach Request message to the eNB and the MME 950 at the time when registration is necessary, i.e. at step S1510. At this time, the Attach Request message transmitted by the UE 910 may include new fields as shown in FIG. 23.

FIG. 23 is a diagram illustrating the attach request message format including new fields according to an embodiment of the present invention.

As shown in FIG. 23, the newly introduced fields include a General Attach field and a Mobility Support field. The Normal Attach field is the field indicating whether to handle the corresponding UE 910 in the same registration procedure (registration procedure of FIG. 7) as legacy UE. If this field is set to 1, the UE is handled in the conventional registration procedure and, otherwise if set to 0, handled in the registration procedure according to an embodiment of the present invention.

Meanwhile, the Mobility Support field is the field indicating whether to perform location tracking and management for the UE 910. If this field is set to 1, this indicates that location tracking and management is performed and, otherwise set to 0, that location tracking and management is not necessary.

Returning to FIG. 15, if the received Attach Request message includes the normal message field set to 0, the MME 950 communicates with the UE 910 and HSS 960 to verify the validity and adequacy of the UE 910 for use in the mobile communication system at step S1520. The MME 950 registers the location of the UE 910 and generates a value indicating whether to support location tracking and management to the HSS 960 at steps S1530 and S1540.

The MME 950 sends the UE 910 an Attach Accept message via eNB 920 at steps S1550 and S1555 and receives an Attach Complete message from the UE 910 at steps S1560 and S1565 to complete the registration procedure. Afterward, the UE location tracking operation is performed additionally at step S1570.

In the UE registration procedure of FIG. 15, it is note that the UE 910 is registered with the mobile communication system but not allocated any bearer path or IP address. That is, the present invention defines a state of the UE 910, especially MTC device, which is capable of being registered with the mobile communication system without bearer and IP resource allocation and capable of performing location tracking and management additionally and the messages and operation procedure therefor.

Once the UE registration procedure of FIG. 15 has completed, a database record related to the corresponding UE 910 is generated in the MME 950 as shown in FIG. 28. FIG. 28 is a diagram illustrating the database record related to the UE which is generated at the MME 950 in the UE registration procedure according to an embodiment of the present invention.

In FIG. 28, the UE identifier is the identifier of the corresponding UE. The Attach Mode indicates the registration mode requested by the corresponding UE. The HSS identifier is optional and the identifier of the HSS managing the UE registration record. The S-GW and P-GW identifiers are the identifiers of the S-GW and P-GW supporting the UE which has been allocated bearer resource and IP address. In this case, if the registration procedure of FIG. 15 has completed, the S-GW and P-GW identifier fields become empty as the case of UE 3 (UE_3) of FIG. 28. This is because the bearer path is not configured in the registration procedure of FIG. 15.

In FIG. 15, if the location update message is transmitted to the HSS 960, the HSS 960 generates and manages a database record for the corresponding UE as shown in FIG. 27. FIG. 27 is a diagram illustrating the database record of the corresponding UE which is generated at the HSS 960.

In FIG. 27, the UE identifier is the identifier of the corresponding UE. The Attach Mode denotes the registration mode requested by the corresponding UE. S-GW and P-GW identifiers are the identifiers of the S-GW and P-GW supporting the UE which has been allocated bearer resource and IP address. In this case, if the registration procedure of FIG. 15 has completed, the S-GW and P-GW identifier fields become empty as the case of UE 3 (UE_3) of FIG. 27. This is because the bearer path is not configured in the registration procedure of FIG. 15.

The Virtual Fixed IP address is a persistent fixed IP address with which the MTC server identifies the UE on the Internet. It is assumed that the virtual fixed IP address is allocated at the UE subscription timing, and the server also knows the IP address for always-on communication with the UE through the subscription procedure. In the case that the UE is not allocated an internal IP address from the P-GW although the UE is shown outside by means of the virtual fixed IP address, the allocated real IP address field is vacated as the cases of UE 2 (UE_2) and UE 3 (UE_3) in FIG. 27. Meanwhile, if a bearer is configured by the P-GW and if an IP address is allocated in the mobile communication system, the allocated real IP address is updated to the address allocated by the mobile communication system as the case of UE 1 (UE_1).

The IP addresses of a Blacklist and a Whitelist denote the IP addresses permitted or blocked access to the UEs allocated the corresponding IP addresses. This is to provide stable and secure service in consideration of the server-UE relationship of 1:N. The corresponding fields are configured at the UE subscription process in response to the requester of the UE owner or for the reason of mobile operator.

As described above, the present invention defines virtual IP address which allows a peer device on the Internet to identify the UE allocated radio resource and bearer path without IP address in the mobile communication system such that the peer device communicates with the UE with the virtual fixed IP address on the Internet.

Figure 16:
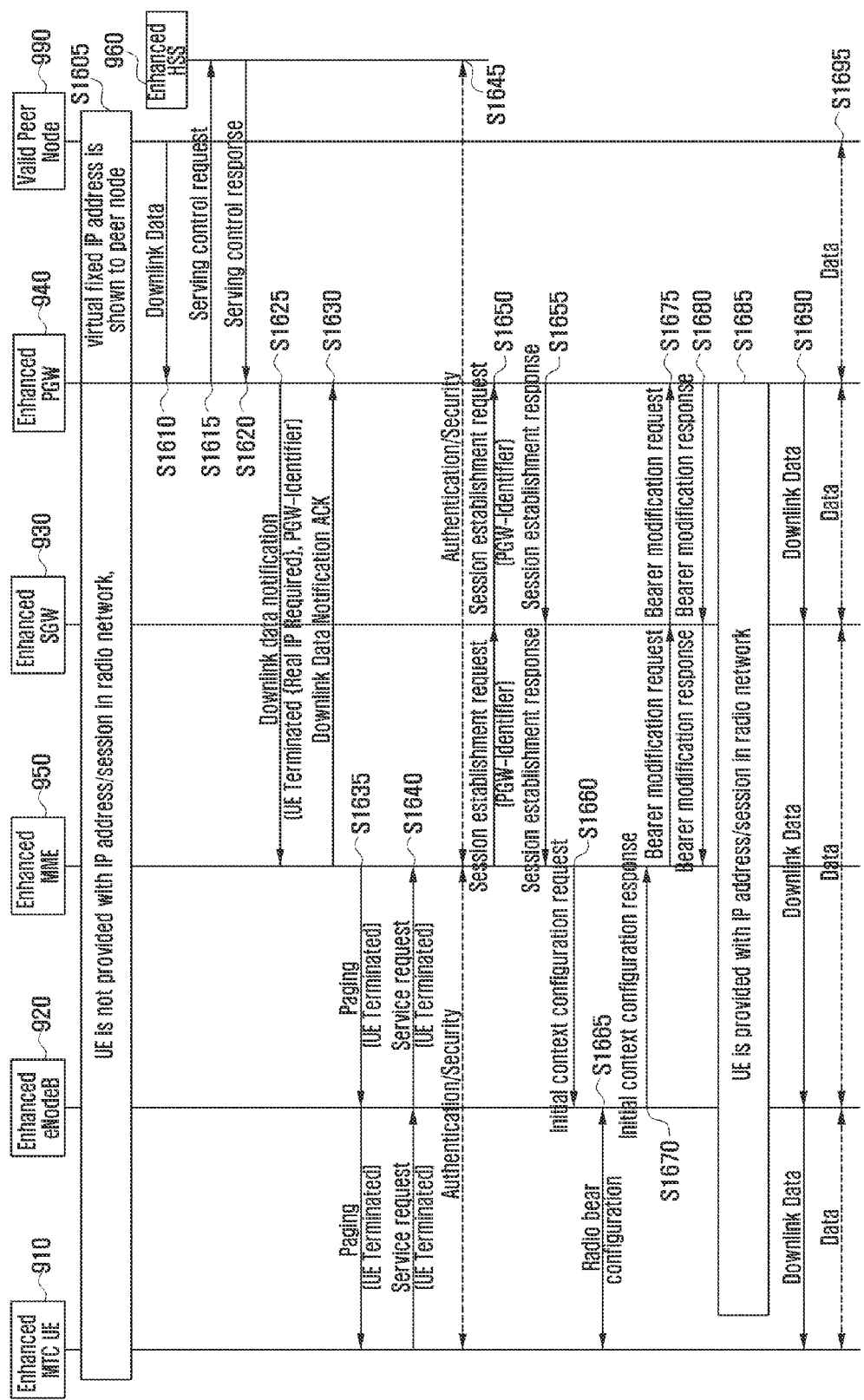
FIG. 16 is a signal flow diagram illustrating the procedure of the UE registered with the mobile communication system for receiving IP packet from another UE (external node) on the Internet according to an embodiment of the present invention.

FIG. 16 is a signal flow diagram illustrating the procedure of the UE registered with the mobile communication system for receiving IP packet from another UE (external node) on the Internet according to an embodiment of the present invention.

In FIG. 16, it is assumed that the UE registers only its location without being allocated any bearer and IP address in registering with the mobile communication system. However, the external node 990 connected to the Internet is capable of identifying the UE by means of a virtual fixed IP address.

If an IP packet is received from a peer node 990 on the Internet at step S1610, the P-GW 940 checks the recipient IP address of the received packet. The recipient IP address is the destination address of the IP packet, i.e. the virtual fixed IP address of the UE 910. In the case that the real IP address corresponding to the UE 910 is absent, the P-GW 940 sends a Serving Control Request message to the HSS 960 at step S1615, to verify the validity on whether to deliver the IP packet to the UE 910, along with the identifier information of the MME 950 managing the UE 910 corresponding to the virtual fixed IP address.

The Serving Control Request message includes the MME identifier of the MME 950 managing the UE 910 corresponding to the virtual fixed IP address, a whitelist of IP addresses to which IP packet transmission is permitted, and a blacklist of IP addresses to which IP packet transmission is prohibited as shown in FIG. 25.

If a Service Control Response message is received from the HSS 960, the P-GW 940 generates a record of the corresponding UE 910 in its database as shown in FIG. 29 and then determines whether the peer node 990 has the right to transmit IP packet to the UE 910. If the peer node 990 has the transmission right, the P-GW 940 transfers a downlink data notification message to the MME 950 managing the UE 910 at step S1625. The downlink data notification message is of allocating radio resource to the corresponding UE 910 and allowing for S-GW and P-GW bearer path configuration and IP address allocation. In this case, the P-GW 940 includes its identifier in the downlink notification message. This is to configure the bearer from the S-GW 930 to the P-GW 940 via the MME 950.

Simultaneously, the P-GW 940 sets the IP address Requested field to 1 as shown in FIG. 24 to identify that the corresponding message is not generated for the conventional downlink data notification message to be transmitted to the MME 950.

The MME 950 sends the P-GW 940 a Downlink Data Notification ACK message at step S1630. The MME 950 sends a paging message to the corresponding UE via the eNB 920 at step S1635. Unlike the conventional paging procedure, the paging message can be used for allocating radio resource to the UE 910 and configuring bearer path and IP address simultaneously. The MME 950 also sets the IP address request field to 1, as shown in FIG. 24, to notify that it is required to configure bearer path configuration and allocate IP address unlike the conventional paging.

Upon receipt of the paging message, the UE 910 sends a service request message to the mobile communication system to initiate resource configuration at step S1640.

Afterward, the MME 950 performs authentication/security procedure to verify the validity and adequacy between the HSS 930 and the UE 910 at step S1645. Next, the MME 950 performs a Create Session Request/Response procedure with the S-GW 930 and the P-GW 940 for bearer resource allocation and IP address allocation at steps S1650 and S1655.

The MME 950 performs Initial Context Setup Request/Response and Radio Bearer Setup procedure with the UE at steps S1660 to S1670.

Finally, the MME 950 performs Modify Bearer Request/Response procedure for guaranteeing the quality of the bearer path passing the S-GW 930 and P-GW 940 at steps S1675 and S1680. Through this, the UE 910 is capable of being allocated IP address and bearer resource and securing radio resource and receiving transmitted by the peer node 990 on the Internet and transmitting the response.

In the present invention, the UE 910 is identified with a virtual fixed IP address such that a peer node 990 on the Internet is capable of transmitting the MTC device Terminated IP packet whenever it wants. In this case, the UE 910 is capable of maintaining the situation having no radio resource and bearer resource and IP address management load and, if an IP packet transmission request arrives at the UE 910, performs radio resource and bearer resource and IP address allocation through a novel MTC Device Terminated paging procedure proposed in the present invention to deliver the IP packet to the MTC device.

Figure 17:
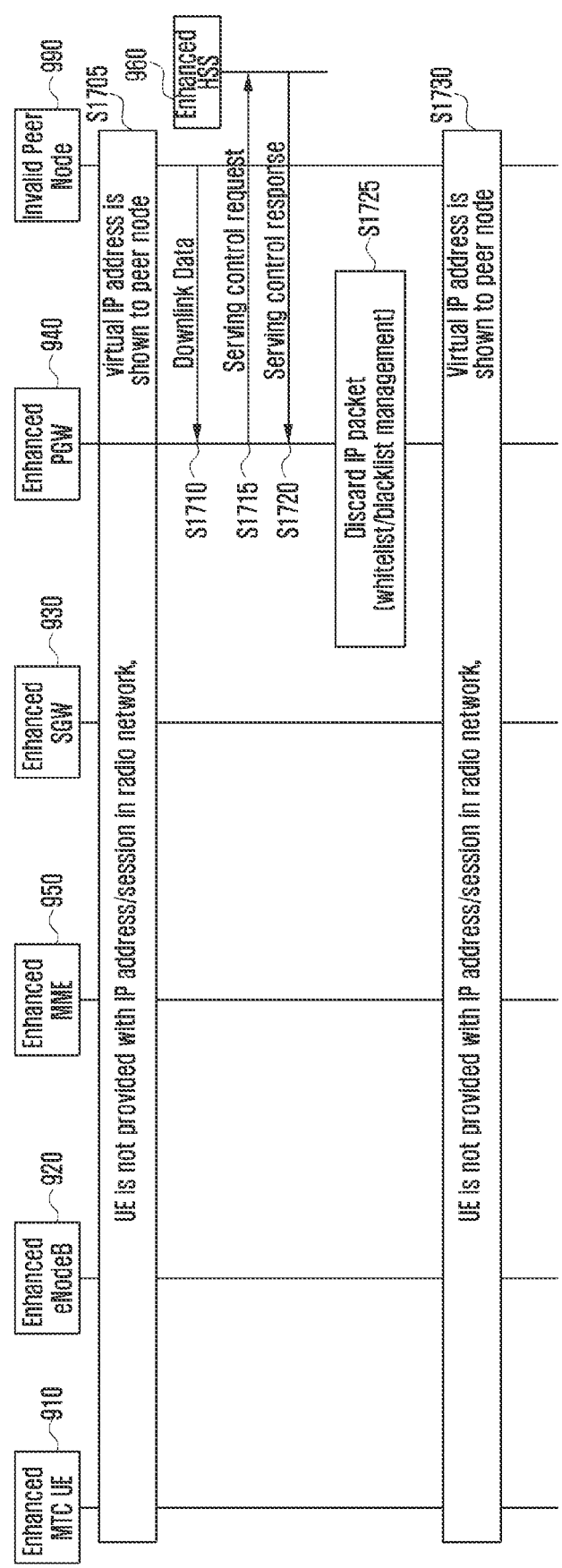
FIG. 17 is a signal flow diagram illustrating the procedure of discarding IP packet transmitted by a peer node.

In FIG. 16, the HSS 960 transmits a response message in response to the serving control request message transmitted by the P-GW 940. However, there may be a situation in which the peer node 990 transmitted the IP packet on the Internet is blocked in the whitelist or blacklist. In this case, the corresponding IP packet is discarded at step S1725 as shown in FIG. 17.

Figure 18:
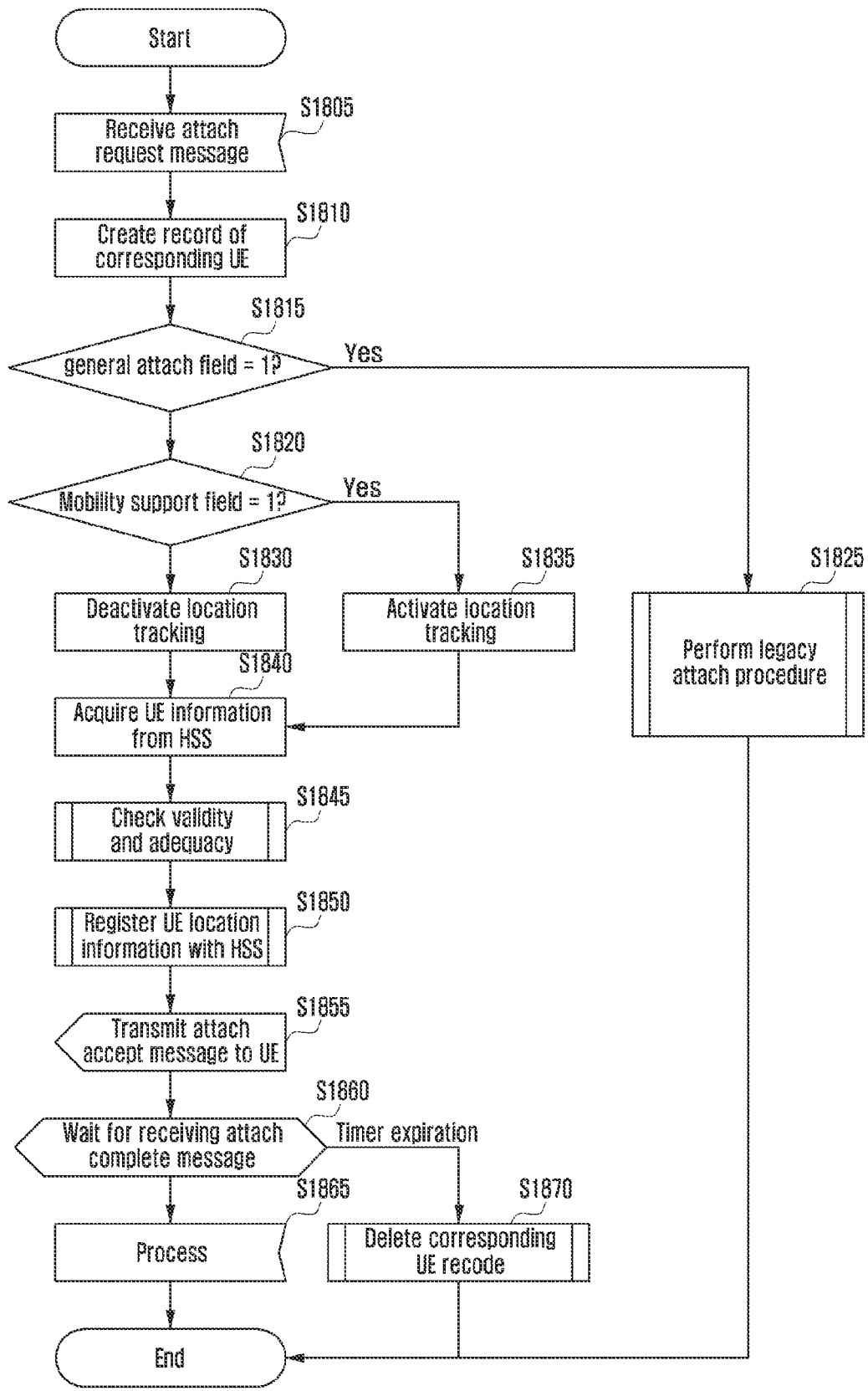
FIG. 18 is a flowchart illustrating the MME operation process in the UE registration procedure according to an embodiment of the present invention.

FIG. 18 is a flowchart illustrating the MME operation process in the UE registration procedure according to an embodiment of the present invention.

The MME 950 receives an Attach Request message from the UE 910 at step S1805 and generates a record of the UE 910 in its database as shown in FIG. 28 at step S1810.

The MME 950 checks the registration type requested by the UE 910 based on field value as shown in FIG. 23. That is, if the General Attach field is set to 1, this means a general mobile communication terminal type other than the proposed type and thus processes the UE registration in the conventional procedure at step S1825. In the case of performing step S1825, the MME 950 performs S-GW 930 and P-GW 940 bearer setup as well as radio resource allocation and allocates IP address through P-GW 940 in the LTE network.

In the case that the registration procedure proposed in the present invention is requested, the General Attach field is set to 0. In this case, the MME 950 checks the Mobility Support field at step S1820. If the Mobility Support field is set to 0, the MME 950 regards the UE 910 as a fixedly installed terminal and deactivates additional UE location tracking and management. Otherwise, if the Mobility Support field is set to 1, the UE is regarded as a mobile terminal and thus the MME 950 activates the UE location tracking and management.

Next, the MME 950 acquires the information on the UE to be registered from the HSS 960 at step S1840. Step S1840 is optional.

Afterward, the MME 950 performs validity and adequacy of the UE 910 with the HSS 960 at step S1845 and registers the location information of the UE 910 with the HSS 960. If the registration is successful, the MME 950 sends an Attach Accept message to the UE 910 at step S1855 and waits for receiving a response message at step S1860.

If an Attach Complete message is received form the UE 910, the MME 950 processes the received attach complete message at step S1865. Otherwise, if no attach complete message is received in a predetermined duration, the MME 950 discards the record of the corresponding UE 910 at step S1870.

Figure 19:
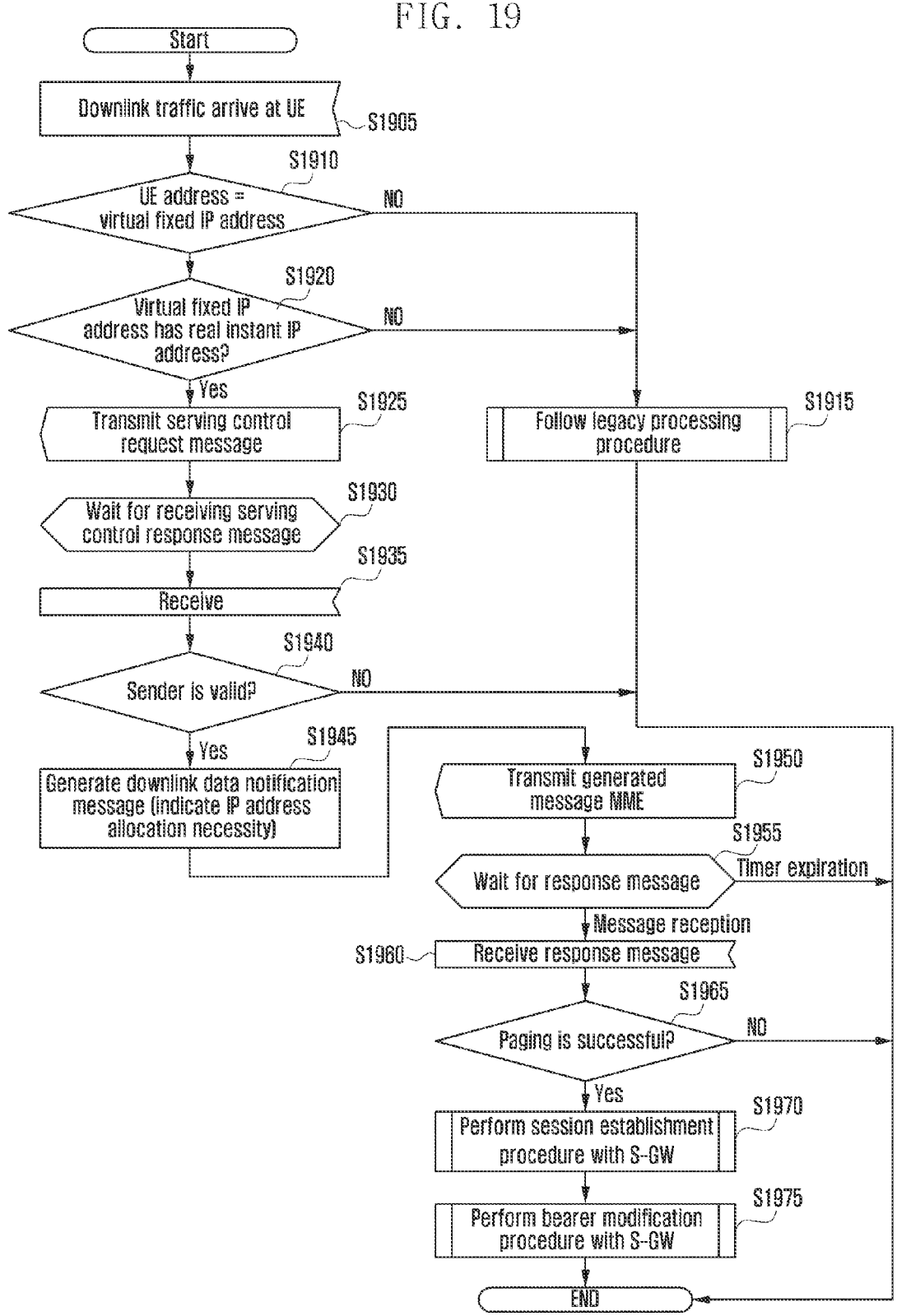
FIG. 19 is a flowchart illustrating the P-GW operation process in the IP packet transmission to the UE 910 according to an embodiment of the present invention in FIG. 16.

FIG. 19 is a flowchart illustrating the P-GW operation process in the IP packet transmission to the UE 910 according to an embodiment of the present invention in FIG. 16.

The P-GW 940 first receives a downlink packet (IP packet) transmitted by the peer node 990 and on the Internet and addressed to the UE 910 at step S1905. The P-GW 940 checks whether the address of the UE 910 in the downlink packet is a virtual fixed IP address or real instant IP address assigned to a general mobile UE at step S1910. The address of the UE 910 is the real instant IP address allocated to the general mobile UE, the P-GW 940 processes the packet according to the conventional IP packet delivery procedure at step S1915.

Otherwise, if the address of the UE 910 is a virtual fixed IP address, the P-GW 940 determines whether the virtual fixed IP address has a real instant IP address at step S1920. If the real instant IP address does not exists, the P-GW 940 sends the HSS 960 a Serving Control Request message including the information for use in determining whether the peer node 990 is valid device along with the information on the MME 950 managing the recipient UE at step S1925. Next, the P-GW 940 waits for receiving a Serving Control Response at step S1930. If the serving control response message is received at step S1935, the P-GW 940 determines whether the peer node 990 is valid as the downlink packet transmitter at step S1935.

If the peer node 990 is verified, the P-GW 940 generates a Downlink Data Notification message notifying of the necessity of IP address allocation at step S1945. The P-GW 940 sends the MME 950 the Downlink Data Notification message at step S1950 and waits for receiving a response at step S1955.

If the Downlink Data Notification ACK message is received from the MME 950 at step S1960, the P-GW 940 judges that radio resource has been allocated to the UE 910 successfully.

If paging is successful at step S1965, the P-GW 940 performs the session establishment procedure with the S-GW 930 at step S1970 to allocate bearer resource between S-GW 930 and P-GW 940 and allocates IP address to the UE 910 at step S1970. Next, the P-GW 940 performs bearer modification procedure with the S-GW 930 at step S1975.

Figure 20:
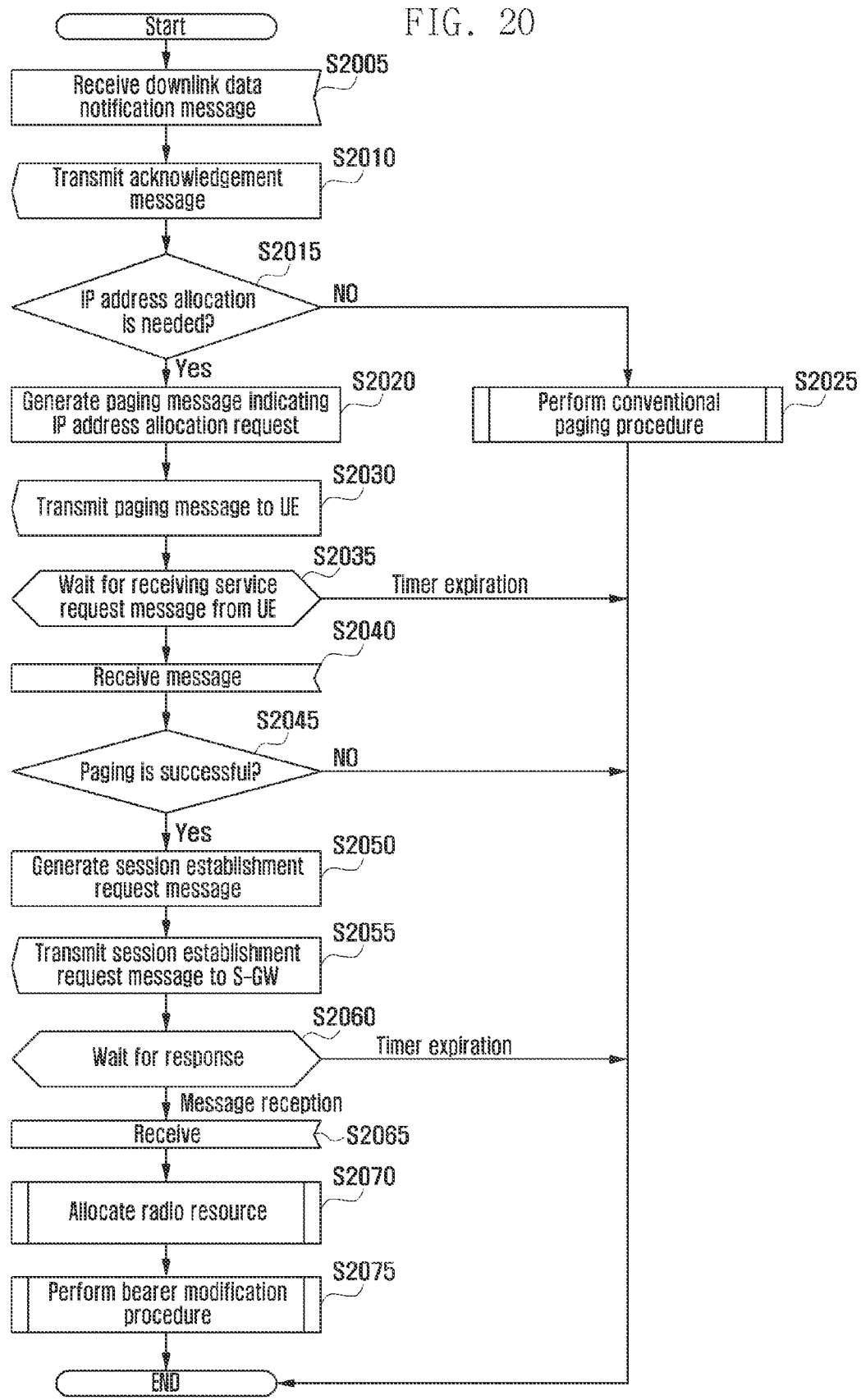
FIG. 20 is a flowchart illustrating the operation process of the MME 950 in IP packet transmission to the UE 910 according to an embodiment of the present invention in FIG. 16.

FIG. 20 is a flowchart illustrating the operation process of the MME 950 in IP packet transmission to the UE 910 according to an embodiment of the present invention in FIG. 16.

The MME 950 first receives the Downlink Data Notification message at step S2005. The Downlink Data Notification message includes the information indicating the necessity of allocating IP address to the UE 910 and the identifier of the P-GW 940 for bearer connection establishment through paging. The MME 950 sends the P-GW 940 an acknowledgement message corresponding to the Downlink Data Notification message. The MME 950 determines whether the Downlink Data Notification message includes the IP address allocation request. By checking the IP Address Requested field of this message, it is possible to determine whether the IP address allocation request is configured.

If the IP address allocation request is not configured, the MME 950 performs the conventional paging procedure at step S2025. Otherwise if the IP address allocation request is configured, the MME 950 generates a paging message including the IP address allocation request at step S202 and sends the paging message to the UE 910 via the eNB 920 at step S2030.

The MME 950 waits for receiving a Service Request ACK message from the UE 910 at step S2035. If the Service Request ACK message is received at step S2040, the MME 950 determines whether the paging is successful at step S2045.

If the paging is successful, the MME 950 generates a Create Session Request message for allocating bearer resource via S-GW 930 and P-GW 940 and a real IP address to the UE 910 simultaneously at step S2050. In this case the MME 950 uses the P-GW identifier included in the Downlink Data Notification message received at step S2005 for establishing the connection to the P-GW 940 which has received the IP packet from the peer node 990.

The MME 950 sends the S-GW 930 the generated Session Creation Request message at step S2055 and waits for receiving a response at step S2060. If the MME 950 receives a Create Session Response message is received, this means that the bearer resource and IP address are allocated successfully. Accordingly, if the Session Creation Response message is received at step S2065, the MME 950 performs a radio resource allocation procedure at step S2070 and performs a bearer modification procedure by reflecting the service quality to the bearer path at step S2075.

Afterward, the packet arrived with the virtual fixed IP address from the internet Node can be delivered to the UE 910 through the radio link of the mobile communication system.

Figure 21:
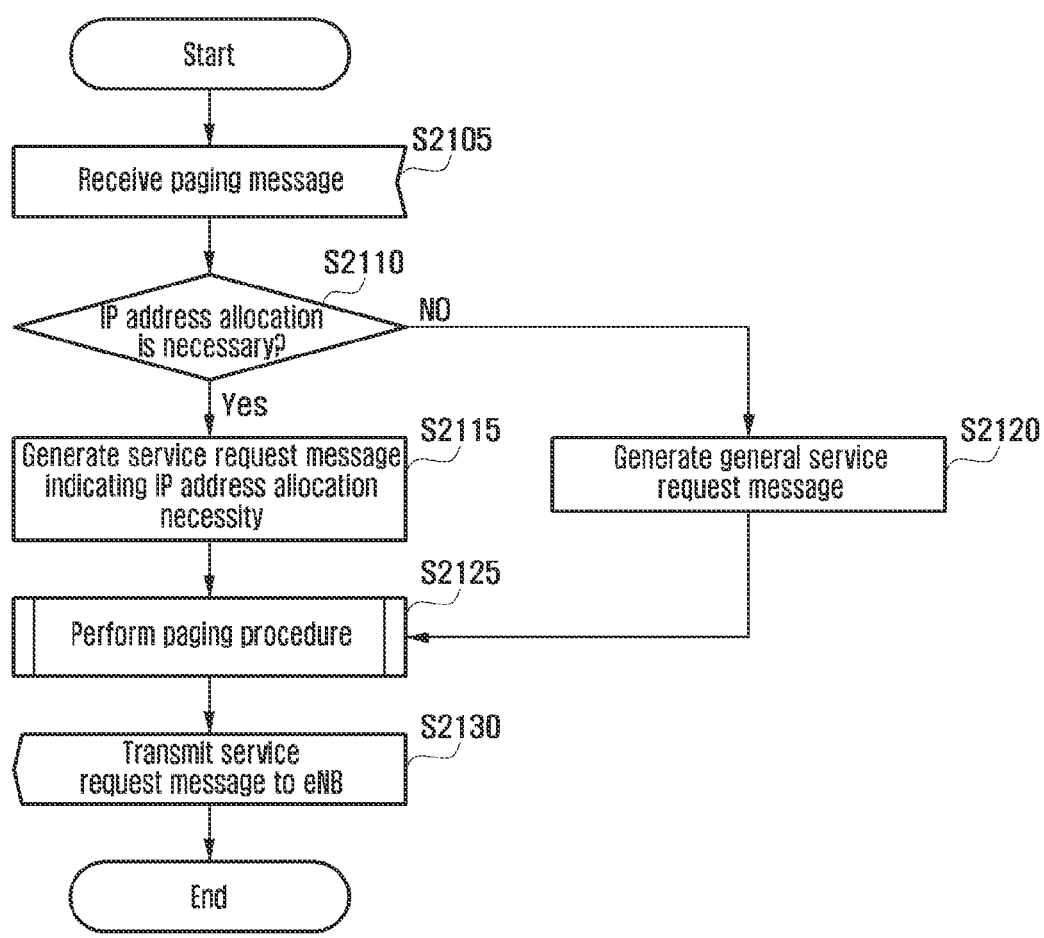
FIG. 21 is a flowchart illustrating the operation process of the UE 910 in the IP packet transmission to the UE 910 according to an embodiment of the present invention in FIG. 16.

FIG. 21 is a flowchart illustrating the operation process of the UE 910 in the IP packet transmission to the UE 910 according to an embodiment of the present invention in FIG. 16.

The UE 910 receives the paging message transmitted by the MME 950 at step S2105. Next, the UE 910 determines whether the paging message including IP address allocation instruction indicator for the UE 910 at step S2110. If IP address allocation is necessary, the UE generates a Service Request message indicating the necessity of IP address allocation at step S2115. If IP address allocation is not necessary, the UE generates a general service request message at step S2120.

Next, the UE 910 performs the paging procedure at step S2125 and sends the eNB 920 a Service Request message at step S2130.

Figure 22:
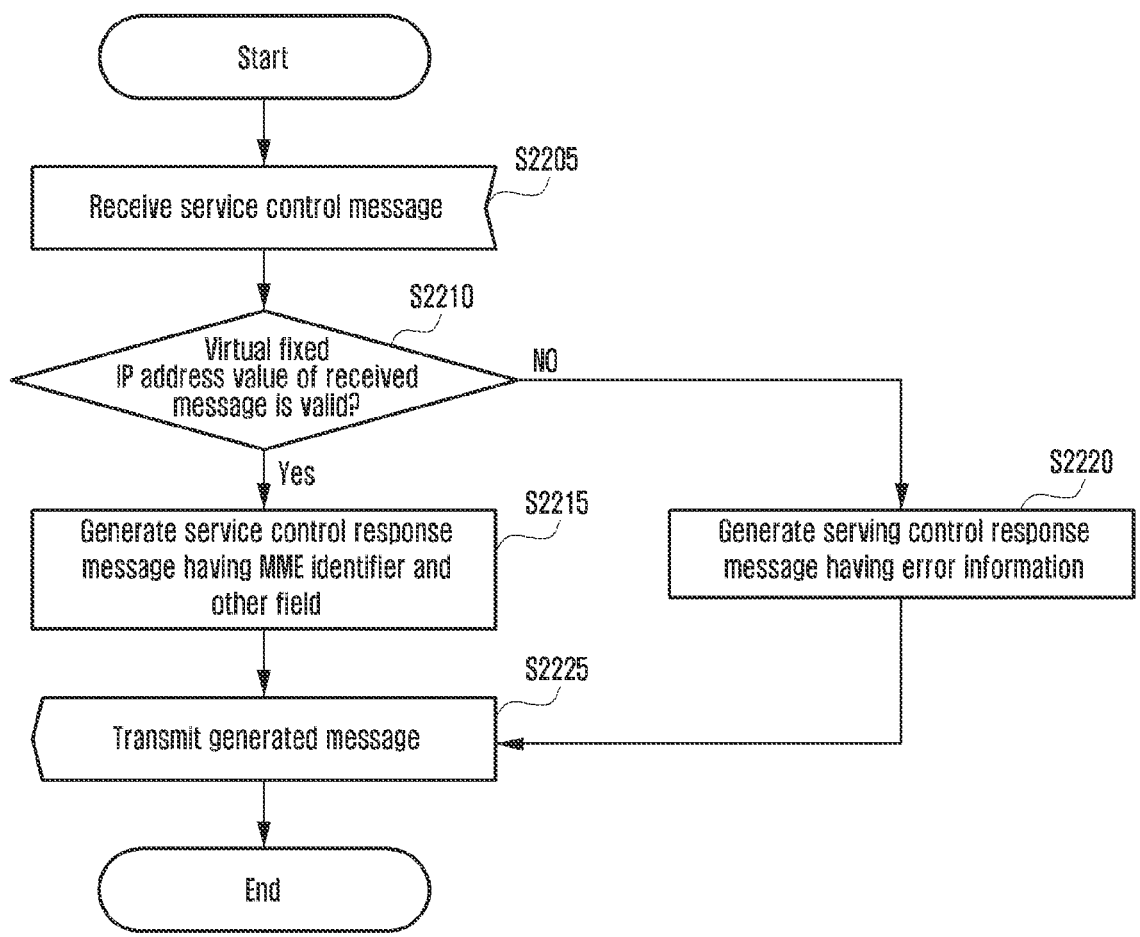
FIG. 22 is a flowchart illustrating the operation process of the HSS 960 in the IP packet transmission to the UE 910 according to an embodiment of the present invention in FIG. 16.
Figure 26:
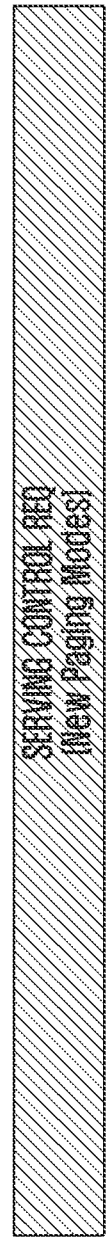
FIG. 26 is a diagram illustrating a filed included in the serving control response message according to an embodiment of the present invention.

FIG. 22 is a flowchart illustrating the operation process of the HSS 960 in the IP packet transmission to the UE 910 according to an embodiment of the present invention in FIG. 16.

The HSS 960 first receives a Service Control message from the P-GW 940 at step S2205. The HSS 960 looks up the database to determine whether the virtual fixed IP address of the UE 910 is valid at step S2210.

If the virtual fixed IP address of the UE 910 is valid, the HSS 960 generates a Serving Control Response message including the MME identifier, a whitelist, and a blacklist at step S2215. If the virtual fixed IP address of the UE 910 is invalid, the HSS 960 generates the Serving Control Response message including error information.

Next, the HSS 960 sends the Serving Control Response message to the P-GW 940 at step S2225.

The present invention is capable of solving the problems of the conventional method, 1) processing and memory load increase in mobile communication network for always-on and 2) always-on communication service inefficiency due to IP address shortage.

First, in order to solve the problem 1), a) the present invention defines a new UE state reflecting the MTC device characteristics (UE state without radio, bearer, IP address resource; more simplified state without necessity of mobility management for the fixed type UE). In order to support such state, 2) the present invention defines a new UE registration procedure and operation. In addition, c) the present invention allows the UE to receive inbound packet without IP address through newly defined packet reception procedure.

Figure 30:
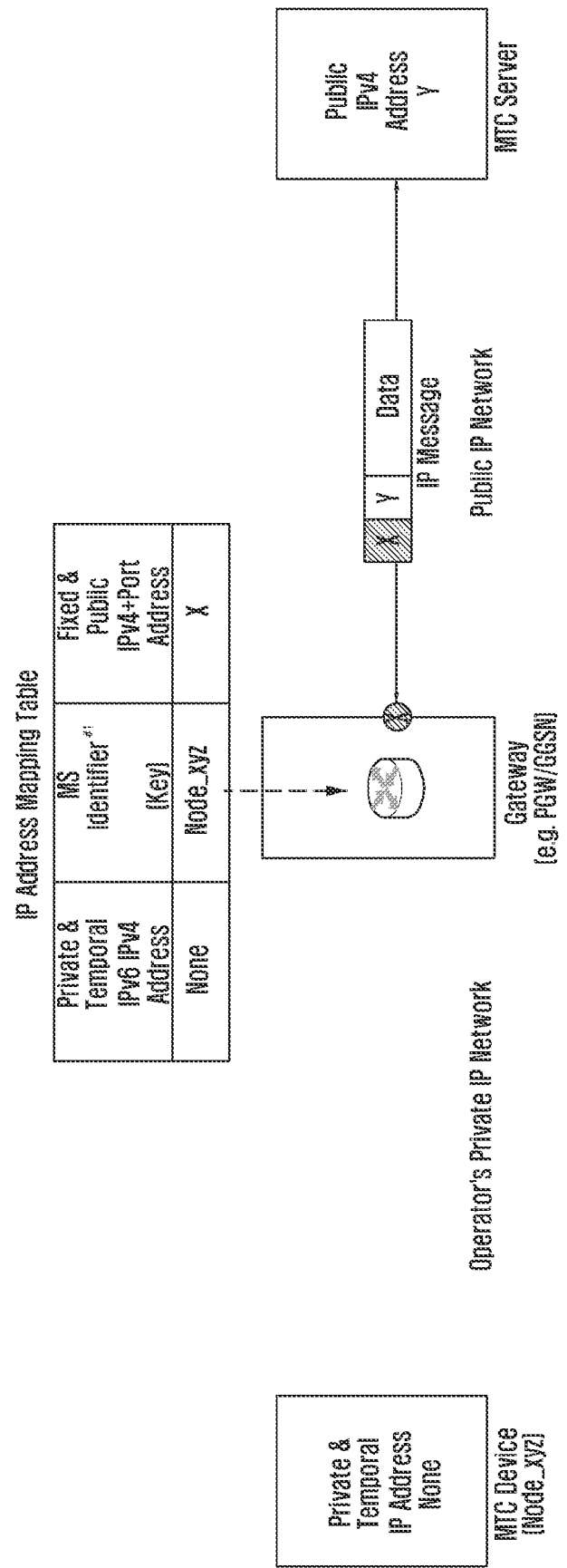
FIGS. 30 to 32 are diagrams illustrating IP address allocation at the UE registration complete step, paging step, and communication step according to an embodiment of the present invention.
Figure 31:
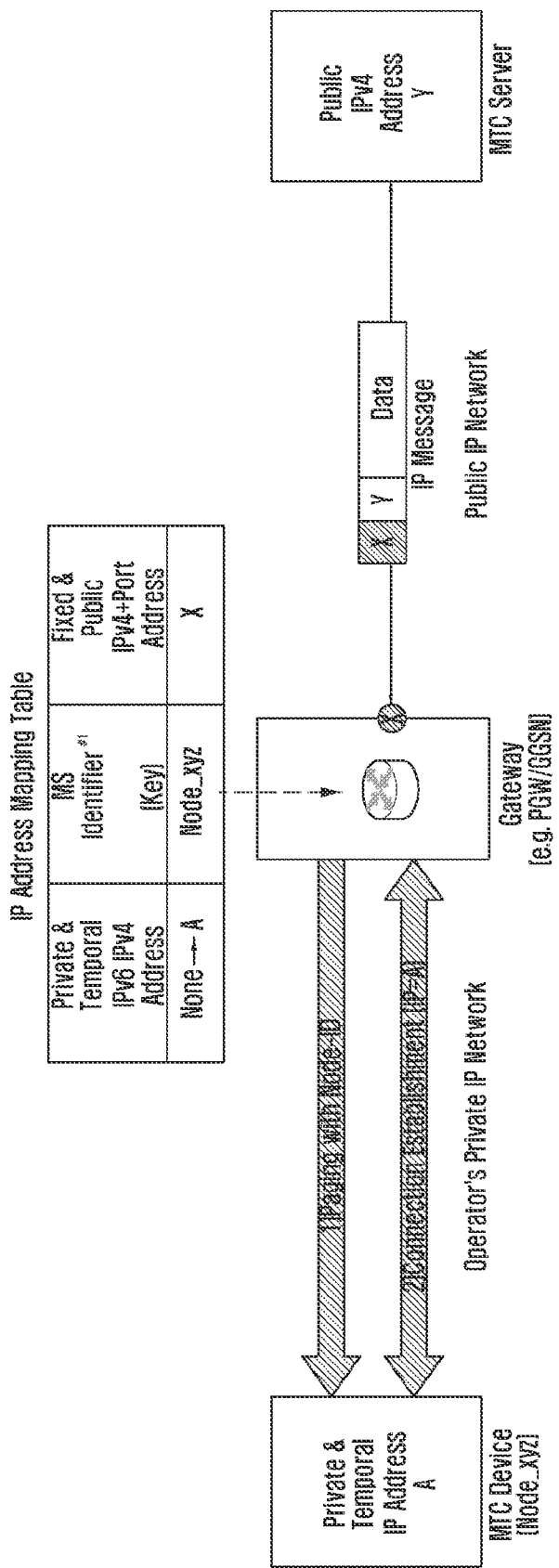
Figure 32:
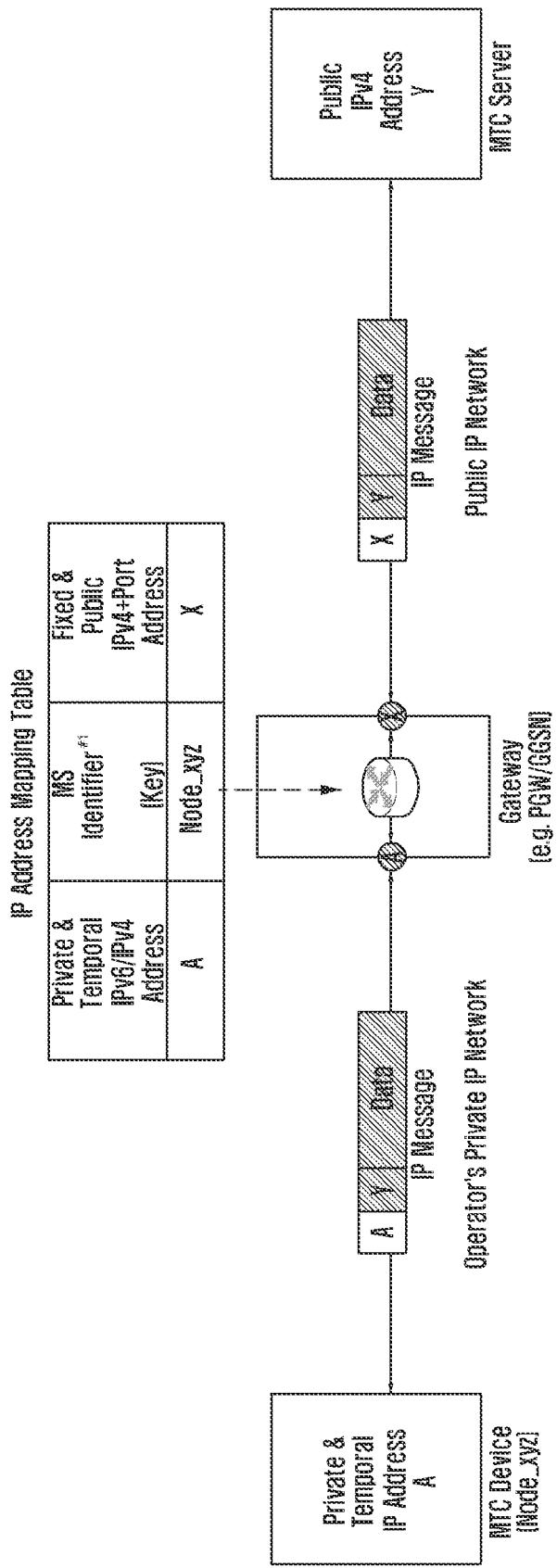

Descriptions are made of the IP allocation state to the UE at UE registration completion step, paging step, and communication step with reference to FIGS. 30 to 32.

FIG. 30 is a diagram illustrating the state after UE's subscription and registration with the mobile communication system. As shown in FIG. 30, the UE has no IP address allocated in the mobile communication system but a virtual fixed IP address exposed to outside via the P-GW. The MTC server (or peer node) on the Internet sets the corresponding virtual fixed IP address as the destination address to transmit an IP packet. If the IP packet is received, the P-GW secures the IP address and wired/wireless resource that can be actually used in the mobile communication system through an improved paging procedure for performing simultaneous radio resource, bearer resource, and IP address allocations as shown in FIG. 31. In FIG. 31, the real IP address A is allocated to the UE. Accordingly, the P-GW is capable of transmitting/receiving IP packets within the mobile communication system using the IP address A allocated by the mobile communication system and using the IP address X outside the mobile communication system.

Second, how to solve 2) IP address shortage problem is described from the view point of implementation of the proposed method.

The first approach is to connect the MTC server and the P-GW through tunneling. Unlike the general mobile UEs, the MTC device is accessible by a small number of legal MTC server and operators. Accordingly, by connecting the MTC server and the P-GW through a layer 2/3 tunnel and using the Private IP addresses negotiated between the MTC server and P-GW, it is possible to solve the IP shortage problem along with the virtual fixed IP address proposed in the present invention.

Figure 33:
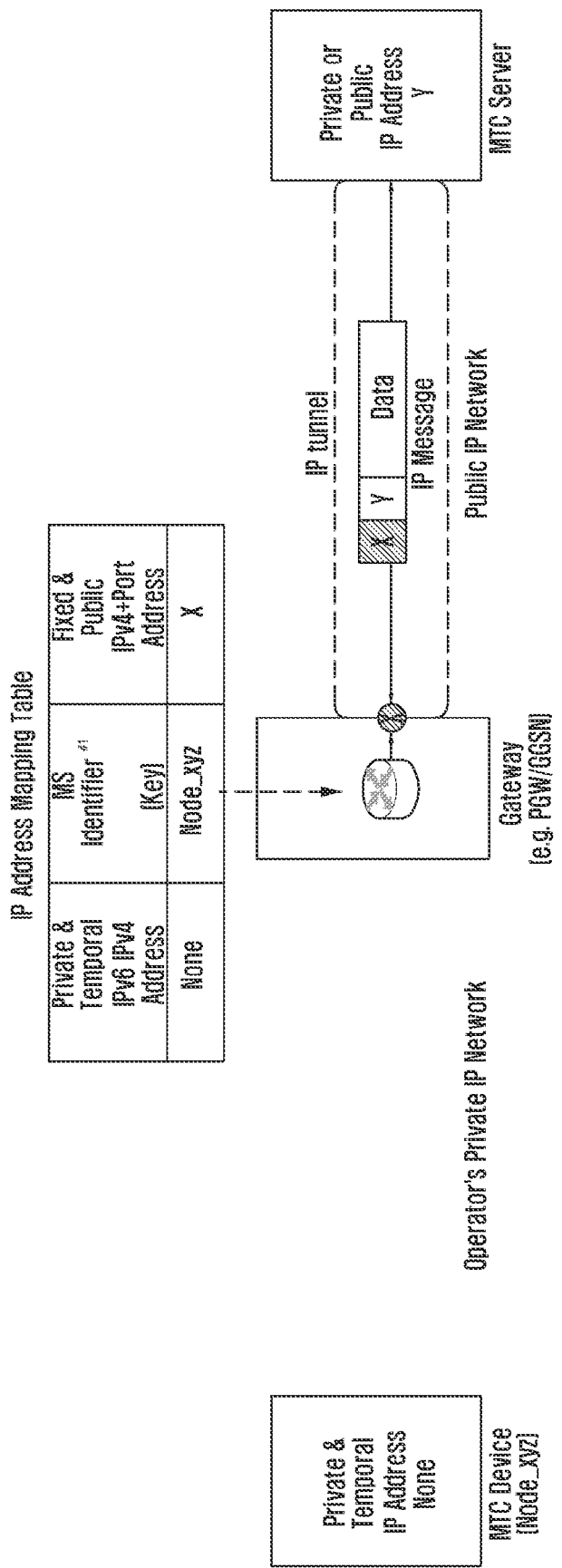
FIGS. 33 to 35 are diagrams illustrating IP address allocation at the UE registration complete step, paging step, and communication step when MTC server and P-GW are connected through tunneling according to an embodiment of the present invention.
Figure 34:
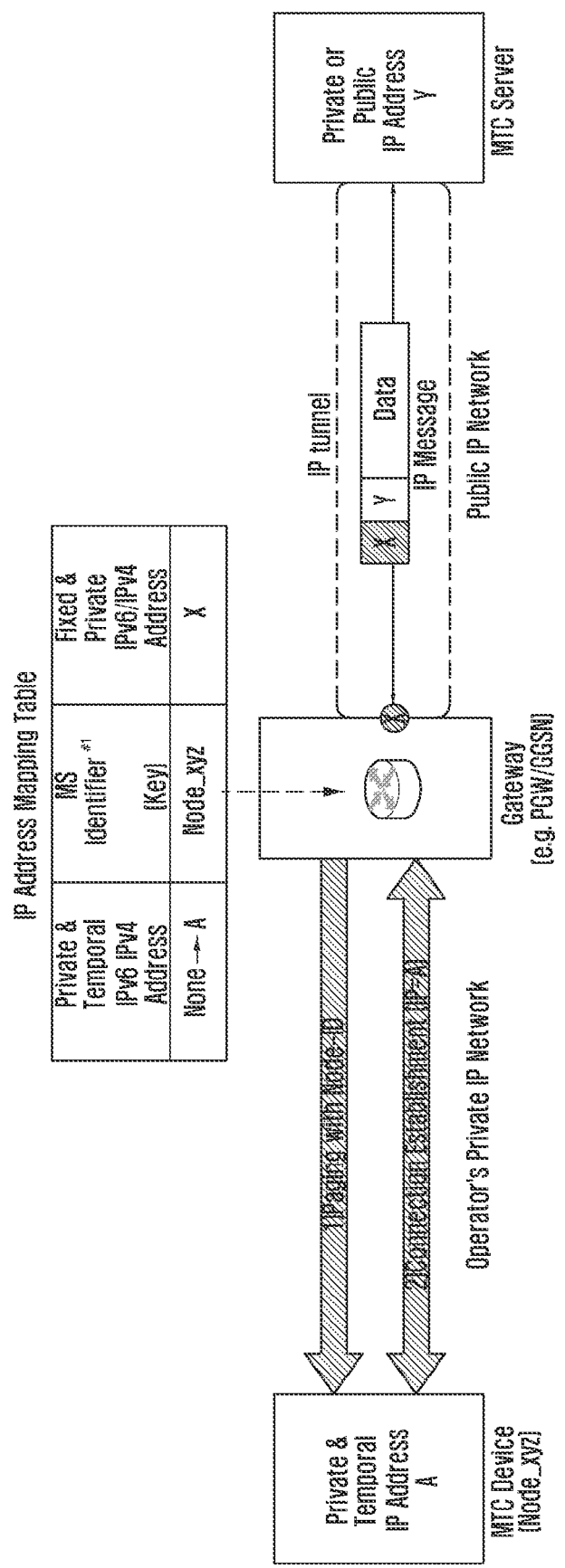
Figure 35:
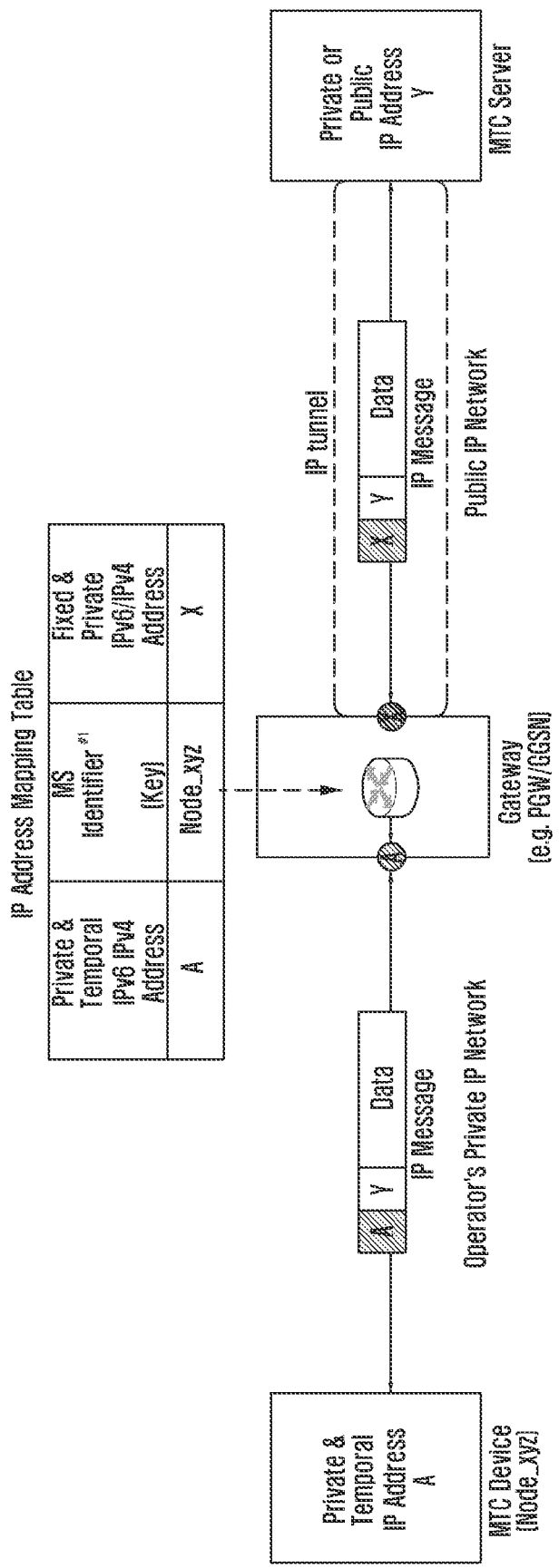

This is described with reference to FIGS. 33 to 35. The embodiment of FIGS. 33 to 35 differs from the embodiment of FIGS. 30 to 32 in that the MTC server and the P-GW are connected through secured tunneling. Accordingly, the MTC server and the P-GW use a negotiated address system other than public Internet addresses such that the available IP address ranges may increase exponentially.

The second approach is to extend Domain Name Service (DNS) on the basis of the method proposed in the present invention. This is depicted as a signal flow diagram in FIG. 36.

Figure 36:
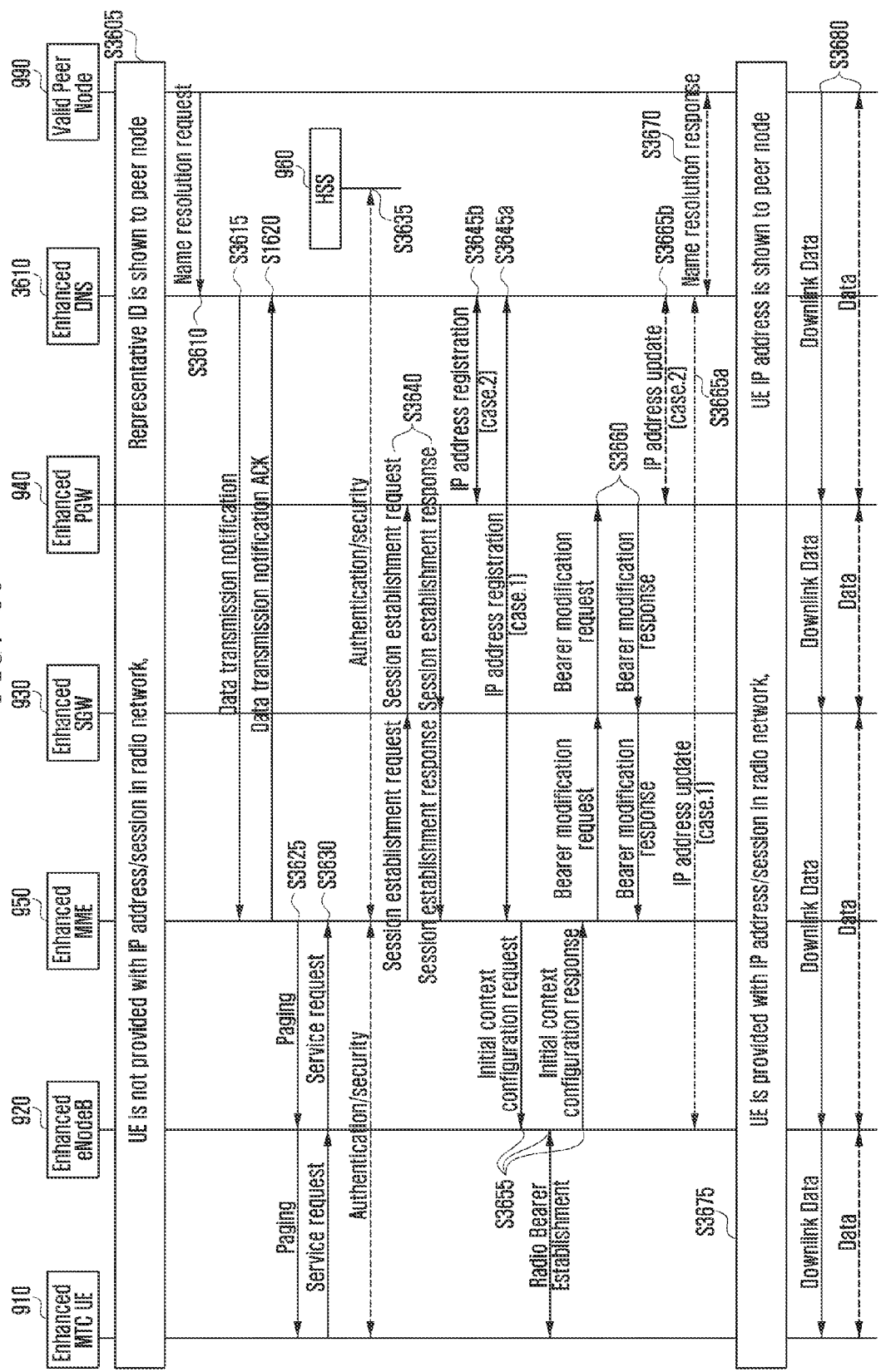
FIG. 36 is a signal flow diagram illustrating a procedure of allocating IP address to the UE 910 using a DNS server according to another embodiment of the present invention.

According to the embodiment of FIG. 36, it is possible to reduce the number of IP addresses to be used simultaneously with the database allocating no real IP addresses in DNS and as a consequence solving the IP address shortage problem. Unlike the procedure of FIG. 16 in which the peer node remembers the virtual fixed IP address, the peer node uses a Domain Name in the procedure of FIG. 36. That is, the peer node stores the ID of the UE and checks the address corresponding to the ID with the assistance of the DNS.

Accordingly, in the case that the DNS is managed in the mobile communication system, the UE is not allocated an IP address and, when the DNS receives an IP address check request for a specific UE ID, allocates radio resource, bearer resource and IP address at that time. The newly allocated UE's IP address is informed to the peer node through a DNS response so as to communicate with each other.

The aforementioned procedure is described in detail with reference to FIG. 36.

The UE 910 is in the state where the real IP address is not allocated but Representative ID at step S3605. In order for the peer node 990 to transmit an IP packet to the UE 910, it is necessary to know the IP address or equivalent information. Accordingly, the peer node 990 sends the DNS 3610 a Name Resolution Request message at step S3610. The DNS 3610 sends the MME 950 a data transmission notification message for allocating radio resource, bearer resource, and IP address at step S3615 and S3620. The MME 950 pages the UE 910 at step S3625 to initiate the radio resource, bearer resource, and IP address allocation procedure.

In response to the paging message from the MME 950, the UE sends the MME 950 a Service Request message at step S3630. The MME 950 communicates with the HSS 960 and the UE 910 to perform authentication/security procedure to verify the validity and adequacy at step S3635.

The MME 950 performs the Create Session Request/Response procedure with the P-GW 940 to allocate bearer resource and IP address to the UE 910 at step S3640. The MME 950 or P-GW 940 notifies the DNS 3610 of the IP address of the UE 910 which has been determined through the IP address registration procedure at step S3645a or S3645b. The DNS 3610 sends a Name Resolution Response message to the peer node 910 at step S3650. Through this procedure, the peer node 990 is capable of acquiring the real IP address corresponding to the UE ID at step S3675.

At this same time with the IP address allocation procedure, the Initial Context Setup procedure and modify Bearer Request/Response procedure are performed.

Once the above procedure has completed, the peer node 990 is capable of communicating with the UE 910 at step S3680.

Figure 37:
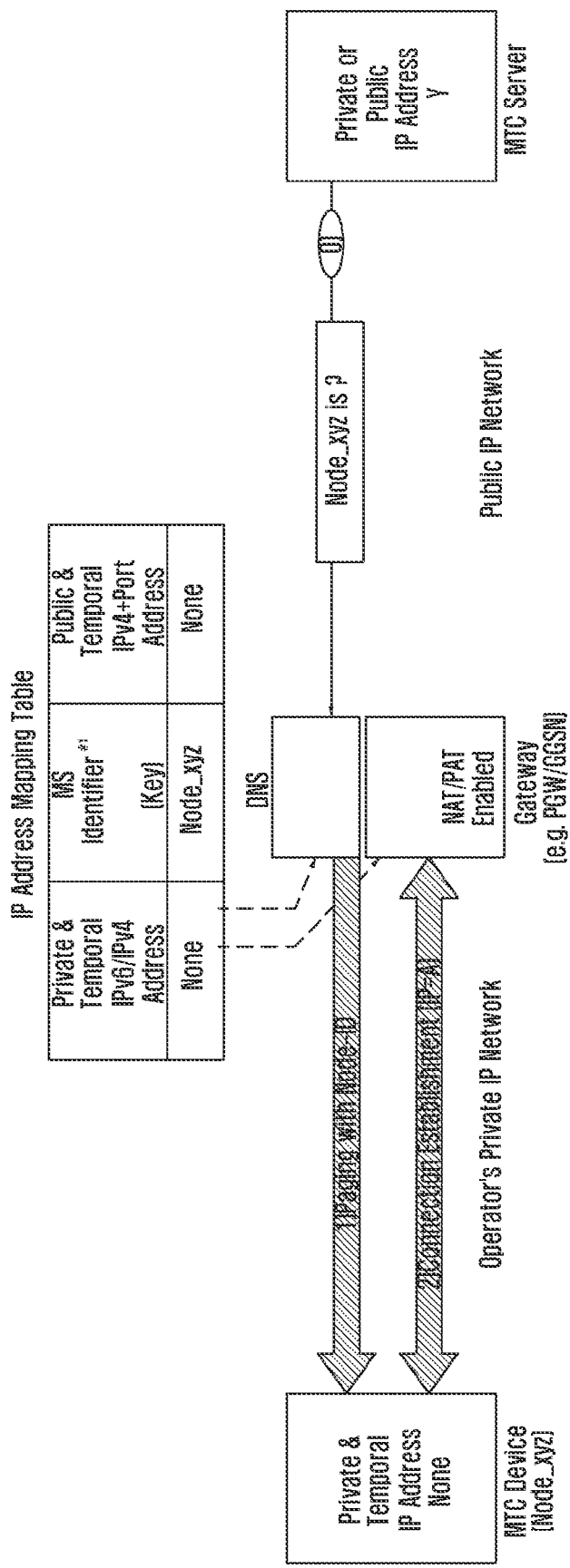
FIGS. 37 to 39 are diagrams illustrating DNS-based method corresponding to FIGS. 30 to 32.
Figure 38:
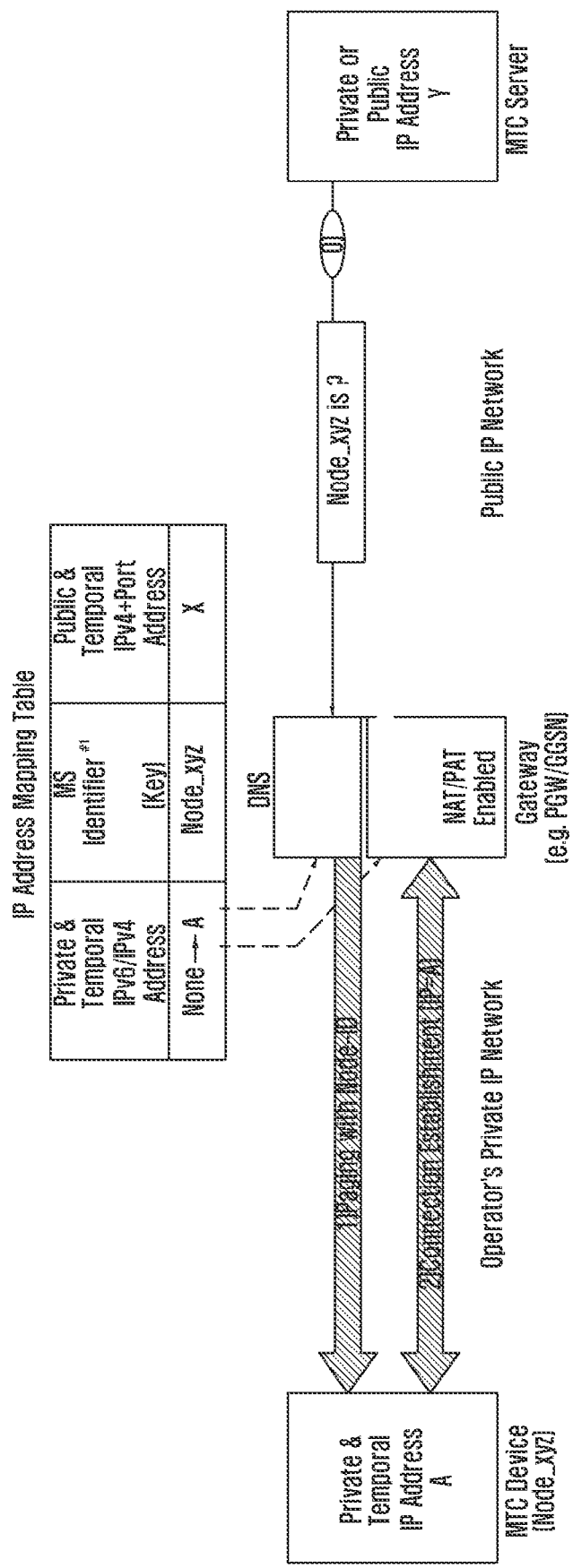
Figure 39:
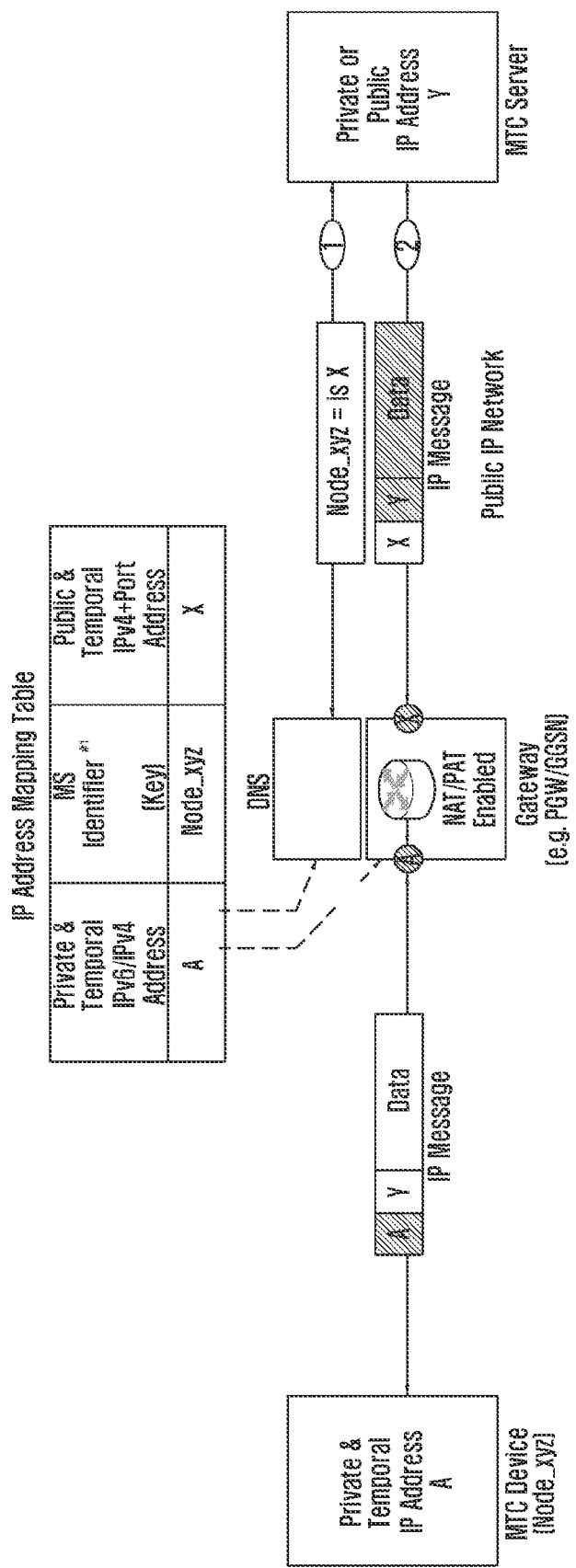

FIGS. 37 to 39 are diagram illustrating exemplary DNS-based operations corresponding to FIGS. 30 to 32. In FIG. 37, the MTC server (or peer node) requests the DNS server for the IP address of the UE by transmitting a UE ID. In this state, the MME allocates radio resource, bearer resource, and IP address to the UE through paging as proposed in the present invention. In FIG. 38, the UE is allocated a private instant IP address A and a public instant IP address X. In this state, the IP address A is used within boundary of the mobile communication system, and the IP address X used as the Internet address of the corresponding UE for IP packet transmission/reception with a node outside the mobile communication system.

While embodiments of the present invention have been shown and described in the specification and drawings to illustrate and explain the present invention, it should be understood that the present invention is not limited to these specific embodiments. That is, it is obvious to those skilled in the art that various changes and modification may be made therein without departing from the technical concept of the invention.

What is claimed is:

1. A method for providing a terminal with a service in a mobile communication system, the method comprising:
transmitting to a mobility management entity an attach request message for initiating registration of the terminal having a virtual Internet Protocol (IP) address with the mobile communication system;
registering, at the mobility management entity, a location of the terminal with a home subscriber server; and
completing the registration by transmitting an attach accept message from the mobility management entity to the terminal,
wherein the virtual IP address is used at a peer node on the Internet for identifying the terminal to transmit terminal terminated IP packets.

2. The method of claim 1, further comprising:
generating, when a Packet Data Network (PDN) gateway receives a packet addressed to the terminal from the peer node, a downlink data notification message;
transmitting the downlink data notification message to the mobility management entity; and
allocating, at the mobility management entity, radio resource, bearer resource, and IP address to the terminal by paging the terminal.

3. The method of claim 1, wherein the attach request message comprises at least one of a general attach field for indicating a registration mode of the terminal and a mobility support field for indicating whether perform terminal location tracking.

4. The method of claim 1, wherein completing comprises generating, when the registration completes, a record in a database of the mobility management entity, the record comprising at least one of a terminal identifier, a home subscriber server identifier, a serving gateway identifier, and a Packet Data Network (PDN) gateway identifier.

5. The method of claim 1, wherein completing comprises generating, when the registration completes, a record in a database of the home subscriber server, the record comprising at least one of a terminal identifier, an attach mode, a serving gateway identifier, a Packet Data Network (PDN) gateway identifier, a virtual fixed IP address, a blacklist IP address, and a whitelist IP address.

6. The method of claim 2, wherein the downlink data notification message comprises at least one of an IP address allocation request and an identifier of the PDN gateway.

7. The method of claim 2, wherein receiving a packet comprises determining, at the PDN gateway, whether transmit the received packet to the terminal by transmitting a serving control request message to the home subscriber server.

8. The method of claim 7, wherein the serving control request message comprises at least one of an identifier of the mobility management entity managing the terminal, a whitelist IP address list and a blacklist IP address list.

9. The method of claim 7, further comprising discarding, at the PDN gateway when the packet is invalid to be transmitted to the terminal, the received packet.

10. The method of claim 2, further comprising identifying, at the peer node, the terminal using the virtual IP address and transmitting the packet to the terminal.

11. An apparatus for providing a terminal with a service in a mobile communication system, the apparatus comprising:
a terminal configured to be allocated a virtual Internet Protocol (IP) address and to transmit an attach request message for initiating registration with the mobile communication system; and
a mobility management entity configured to register, when the attach request message is received, location of the terminal with a home subscriber server, to complete the registration by transmitting an attach accept message to the terminal,
wherein the virtual IP address is used at a peer node on the Internet for identifying the terminal to transmit terminal terminated IP packets.

12. The apparatus of claim 11, further comprising a Packet Data Network (PDN) gateway configured to generate, when the PDN gateway receives a packet addressed to the terminal from the peer node, a downlink data notification message, to transmit the downlink data notification message to the mobility management entity, and to allocate, at the mobility management entity, radio resource, bearer resource, and IP address to the terminal by paging the terminal.

13. The apparatus of claim 11, wherein the attach request message comprises at least one of a general attach field for indicating a registration mode of the terminal and a mobility support field for indicating whether perform terminal location tracking.

14. The apparatus of claim 11, wherein a record is generated in a database of the mobility management entity when the registration completes, the record comprising at least one of a terminal identifier, a home subscriber server identifier, a serving gateway identifier, and a Packet Data Network (PDN) gateway identifier.

15. The apparatus of claim 11, wherein a record is generated in a data base of the home subscriber server, when the registration completes, the record comprising at least one of a terminal identifier, an attach mode, a serving gateway identifier, a Packet Data Network (PDN) gateway identifier, a virtual fixed IP address, a blacklist IP address, and a whitelist IP address.

16. The apparatus of claim 12, wherein the downlink data notification message comprises at least one of an IP address allocation request and an identifier of the PDN gateway.

17. The apparatus of claim 12, wherein the PDN gateway is further configured to determine whether transmit the received packet to the terminal by transmitting a serving control request message to the home subscriber server.

18. The apparatus of claim 17, wherein the serving control request message comprises at least one of an identifier of the mobility management entity managing the terminal, a whitelist IP address list, and a blacklist IP address list.

19. The apparatus of claim 17, wherein the PDN gateway is further configured to discard, when the packet is invalid to be transmitted to the terminal, the received packet.

20. The apparatus of claim 12, wherein the peer node identifies the terminal using the virtual IP address and transmits the packet to the terminal.

* * * * *